(12) United States Patent  
Yang et al.

(10) Patent No.: US 10,363,806 B2  
(45) Date of Patent: Jul. 30, 2019

(54) POWER TRANSMISSION SYSTEM FOR VEHICLE AND VEHICLE COMPRISING THE SAME

(71) Applicant: BYD COMPANY LIMITED, Shenzhen, Guangdong (CN)

(72) Inventors: Dongsheng Yang, Shenzhen (CN); Yubo Lian, Shenzhen (CN); Jintao Zhang, Shenzhen (CN); Hongbin Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 320 days.

(21) Appl. No.: 15/215,316

(22) Filed: Jul. 20, 2016

(65) Prior Publication Data

US 2016/0325614 A1 Nov. 10, 2016

Related U.S. Application Data

(63) Continuation of application No. PCT/CN2014/089842, filed on Oct. 29, 2014.

(30) Foreign Application Priority Data

Jan. 30, 2014 (CN) .......................... 2014 1 0044681  
Jan. 30, 2014 (CN) ..................... 2014 2 0058197 U

(51) Int. Cl.  
*B60K 6/50* (2007.10)  
*B60K 6/387* (2007.10)  
(Continued)

(52) U.S. Cl.  
CPC ............... *B60K 6/36* (2013.01); *B60K 6/387* (2013.01); *B60K 6/44* (2013.01); *B60K 6/445* (2013.01);  
(Continued)

(58) Field of Classification Search  
CPC .. B60K 6/50; B60K 6/387; B60K 2006/4808; B60K 2006/4825  
(Continued)

(56) References Cited

U.S. PATENT DOCUMENTS 6,506,139 B2 * 1/2003 Hirt .................... B60K 6/365  
477/3  
7,625,311 B2 * 12/2009 Dilzer .................. B60K 6/40  
477/5  
(Continued)

FOREIGN PATENT DOCUMENTS

CN 1378924 A 11/2002  
CN 2602978 Y 2/2004  
(Continued)

OTHER PUBLICATIONS

International Search Report and Written Opinion for Application No. PCT/CN2014/089842, dated Jan. 26, 2015, 11 pages.

*Primary Examiner* — Ha Dinh Ho  
(74) *Attorney, Agent, or Firm* — Sheppard Mullin Richter & Hampton LLP

(57) ABSTRACT

A power transmission system for a vehicle and a vehicle including the same are provided. The power transmission system includes: an engine unit; a plurality of input shafts, in which the engine unit is configured to selectively engage with one of the input shafts when the engine unit transmits power to the input shafts; a plurality of driving gears with one driving gear disposed on one input shaft; an output shaft configured to transfer the power from the input shafts; one or more linked gears rotatable at a different speed relative to the output shaft, in which the linked gears include a plurality of gear parts, the gear parts being configured to mesh with the driving gears on the input shafts; an output unit coupled on the output shaft and configured to transmit the power to front wheels of the vehicle; a clutch disposed on the output (Continued)

US 10,363,806 B2

Page 2 shaft and configured to selectively engage with the linked gear and the output unit so as to drive one or more wheels of the vehicle via the power output by the output unit; and a first motor generator configured to couple with one of the input shaft and the output shaft for power transmission.

19 Claims, 15 Drawing Sheets

(51) Int. Cl.
  *B60K 6/48* (2007.10)
  *B60K 6/36* (2007.10)
  *B60K 6/44* (2007.10)
  *B60K 6/445* (2007.10)
  *B60K 6/547* (2007.10)
  B60K 6/52 (2007.10)
  F16H 3/00 (2006.01)
  B60K 6/442 (2007.10)

(52) U.S. Cl.
  CPC .............. *B60K 6/547* (2013.01); *B60K 6/442* (2013.01); *B60K 6/52* (2013.01); *B60Y 2300/429* (2013.01); *F16H 3/006* (2013.01); *F16H 2200/0034* (2013.01); *F16H 2200/0039* (2013.01); *Y02T 10/623* (2013.01); *Y02T 10/6234* (2013.01); *Y02T 10/6265* (2013.01); *Y10S 903/909* (2013.01); *Y10S 903/914* (2013.01)

(58) Field of Classification Search
  USPC .......................................................... 74/661
  See application file for complete search history.

(56) References Cited

U.S. PATENT DOCUMENTS

| | | | |
|---|---|---|---|
| 8,257,221 B2* | 9/2012 | Leufgen | B60K 6/36 477/3 |
| 2002/0033059 A1 | 3/2002 | Pels et al. | |
| 2002/0088291 A1 | 7/2002 | Bowen | |
| 2002/0177504 A1* | 11/2002 | Pels | B60K 6/36 477/3 |
| 2004/0204286 A1 | 10/2004 | Stridsberg | |
| 2005/0107199 A1 | 5/2005 | Minagawa | |
| 2005/0139035 A1* | 6/2005 | Lee | B60K 6/36 74/661 |
| 2005/0241437 A1 | 11/2005 | Gray, Jr. et al. | |
| 2006/0011395 A1 | 1/2006 | Sugiyama et al. | |
| 2006/0015241 A1 | 1/2006 | Shima | |
| 2006/0272869 A1 | 12/2006 | Hidaka et al. | |
| 2007/0175723 A1 | 8/2007 | Blessing et al. | |
| 2008/0070745 A1 | 3/2008 | Ogata | |
| 2008/0120000 A1 | 5/2008 | Heap et al. | |
| 2009/0176617 A1 | 7/2009 | Dilzer | |
| 2010/0031910 A1 | 2/2010 | Seufert et al. | |
| 2010/0120580 A1 | 5/2010 | Mepham et al. | |
| 2010/0138091 A1 | 6/2010 | Tang et al. | |
| 2010/0145589 A1 | 6/2010 | Kobayashi | |
| 2010/0320016 A1 | 12/2010 | Wang et al. | |
| 2011/0179905 A1 | 7/2011 | Tanba et al. | |
| 2011/0290072 A1* | 12/2011 | Xie | B60K 6/48 74/665 A |
| 2012/0010041 A1 | 1/2012 | Soliman et al. | |
| 2012/0090426 A1 | 4/2012 | Lee et al. | |
| 2012/0245783 A1 | 9/2012 | Tamagawa | |
| 2012/0277944 A1 | 11/2012 | Kaneko et al. | |
| 2012/0310461 A1 | 12/2012 | Maruyama et al. | |
| 2013/0035188 A1 | 2/2013 | Yagasaki | |
| 2013/0068056 A1 | 3/2013 | Van Batavia et al. | |
| 2013/0192417 A1 | 8/2013 | Fujita et al. | |
| 2013/0231848 A1 | 9/2013 | Roberts et al. | |
| 2013/0276576 A1 | 10/2013 | Noguchi et al. | |
| 2013/0288854 A1 | 10/2013 | Kobayashi | |
| 2013/0289810 A1 | 10/2013 | Holmes et al. | |
| 2013/0345019 A1 | 12/2013 | Kaltenbach et al. | |
| 2014/0157923 A1 | 6/2014 | Lee et al. | |

FOREIGN PATENT DOCUMENTS

| | | | |
|---|---|---|---|
| CN | 1618644 | A | 5/2005 |
| CN | 1637327 | A | 7/2005 |
| CN | 1699091 | A | 11/2005 |
| CN | 1728192 | A | 2/2006 |
| CN | 1876460 | A | 12/2006 |
| CN | 101209675 | A | 7/2008 |
| CN | 101219662 | A | 7/2008 |
| CN | 101380887 | A | 3/2009 |
| CN | 101400536 | A | 4/2009 |
| CN | 201214410 | Y | 4/2009 |
| CN | 101450608 | A | 6/2009 |
| CN | 101450609 | A | 6/2009 |
| CN | 101516708 | A | 8/2009 |
| CN | 101549634 | A | 10/2009 |
| CN | 201390137 | Y | 1/2010 |
| CN | 101659203 | A | 3/2010 |
| CN | 201511806 | U | 6/2010 |
| CN | 101973207 | A | 2/2011 |
| CN | 101983150 | A | 3/2011 |
| CN | 201777113 | U | 3/2011 |
| CN | 102009587 | A | 4/2011 |
| CN | 201907400 | U | 7/2011 |
| CN | 102259583 | A | 11/2011 |
| CN | 102259584 | A | 11/2011 |
| CN | 102303517 | A | 1/2012 |
| CN | 102371893 | A | 3/2012 |
| CN | 102381178 | A | 3/2012 |
| CN | 202242966 | U | 5/2012 |
| CN | 102490588 | A | 6/2012 |
| CN | 102555769 | A | 7/2012 |
| CN | 202319954 | U | 7/2012 |
| CN | 202345366 | U | 7/2012 |
| CN | 2012-Q41396 | * | 9/2012 |
| CN | 102666169 | A | 9/2012 |
| CN | 102673365 | A | 9/2012 |
| CN | 102673382 | A | 9/2012 |
| CN | 102678839 | A | 9/2012 |
| CN | 102678871 | A | 9/2012 |
| CN | 102691770 | A | 9/2012 |
| CN | 202429065 | U | 9/2012 |
| CN | 102781698 | A | 11/2012 |
| CN | 202641355 | U | 1/2013 |
| CN | 202656855 | U | 1/2013 |
| CN | 102910066 | A | 2/2013 |
| CN | 102951005 | A | 3/2013 |
| CN | 102975607 | A | 3/2013 |
| CN | 103029558 | A | 4/2013 |
| CN | 103144528 | A | 6/2013 |
| CN | 103332102 | A | 10/2013 |
| CN | 103373215 | A | 10/2013 |
| CN | 203283020 | U | 11/2013 |
| CN | 203305832 | U | 11/2013 |
| CN | 103527726 | A | 1/2014 |
| CN | 103697118 | A | 4/2014 |
| CN | 203516615 | U | 4/2014 |
| CN | 103832263 | A | 6/2014 |
| CN | 103867657 | A | 6/2014 |
| CN | 103912640 | A | 7/2014 |
| CN | 103921674 | A | 7/2014 |
| CN | 203876574 | U | 10/2014 |
| CN | 203962884 | U | 11/2014 |
| CN | 204095490 | U | 1/2015 |
| DE | 102011115780 | A1 | 4/2012 |
| DE | 102013201744 | A1 | 8/2014 |
| EP | 1122109 | A2 | 8/2001 |
| EP | 2192013 | A1 | 6/2010 |
| EP | 2210758 | A1 | 7/2010 |
| EP | 2255986 | A1 | 12/2010 |
| EP | 2279922 | A1 | 2/2011 |
| EP | 2385270 | A1 | 11/2011 |
| EP | 2439094 | A1 | 4/2012 |
| EP | 2474434 | A1 | 7/2012 |

(56) References Cited

FOREIGN PATENT DOCUMENTS

| | | |
|---|---|---|
| EP | 2508378 A1 | 10/2012 |
| EP | 2517938 A1 | 10/2012 |
| EP | 2641802 A2 | 9/2013 |
| EP | 2738030 A2 | 6/2014 |
| JP | 2013-112073 A | 6/2013 |
| JP | 2013126365 A | 6/2013 |
| JP | 2013240166 A | 11/2013 |
| WO | 99/21263 A2 | 4/1999 |
| WO | 2007/031396 A1 | 3/2007 |
| WO | 2010/054210 A1 | 5/2010 |
| WO | 2013/014510 A1 | 1/2013 |
| WO | 2013/031491 A1 | 3/2013 |

* cited by examiner

POWER TRANSMISSION SYSTEM FOR VEHICLE AND VEHICLE COMPRISING THE SAME

CROSS-REFERENCE TO RELATED APPLICATIONS

This application is a continuation application of International Application No. PCT/CN2014/089842, filed Oct. 29, 2014, which is based upon and claims priority to and benefits of Chinese Patent Applications Nos. 201410044681.1 and 201420058197.X, both filed with the State Intellectual Property Office of P. R. China on Jan. 30, 2014. The entire content of the above-identified applications is incorporated herein by reference.

FIELD

The present disclosure relates to a vehicle field, and more particularly to a power transmission system for a vehicle and a vehicle including the power transmission system.

BACKGROUND

To reduce energy consumption, the development and utilization of new energy-efficient vehicles have become a trend. As an energy-efficient vehicle, a hybrid vehicle is driven by at least one of an internal combustion engine and a motor and has various operation modes, and consequently may operate with improved transmission efficiency and fuel economic efficiency.

However, in the related art, the power transmission system in the hybrid vehicle is generally complex in structure, bulky, low in transmission efficiency, and complicated in control strategy. For example, a plurality of gear shift actuating elements needs to be controlled simultaneously during the gear shifting or mode switching.

SUMMARY

Embodiments of the present disclosure seek to solve at least one of the problems existing in the related art to at least some extent.

Embodiments of the present disclosure provide a power transmission system for a vehicle. The power transmission system includes: an engine unit; a plurality of input shafts, in which the engine unit is configured to selectively engage with one of the input shafts when the engine unit transmits power to the input shafts; a plurality of driving gears with one driving gear disposed on one input shaft; an output shaft configured to transfer the power from the input shafts; one or more linked gears rotatable at a different speed relative to the output shaft, wherein the linked gears include a plurality of gear parts, the gear parts being configured to mesh with the driving gears on the input shafts; an output unit coupled on the output shaft and configured to transmit the power to front wheels of the vehicle; a clutch disposed on the output shaft and configured to selectively engage with the linked gear and the output unit so as to drive one or more wheels of the vehicle via the power output by the output unit; and a first motor generator configured to directly or indirectly couple with one of the input shaft and the output shaft for power transmission.

With the power transmission system for the vehicle according to embodiments of the present disclosure, the power output by at least one of the engine unit and the first motor generator may be output to the output unit via the clutch. Therefore, the power transmission system according to embodiments of the present disclosure is compact in structure and easy to control.

Embodiments of the present disclosure further provide a vehicle. The vehicle includes the abovementioned power transmission system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
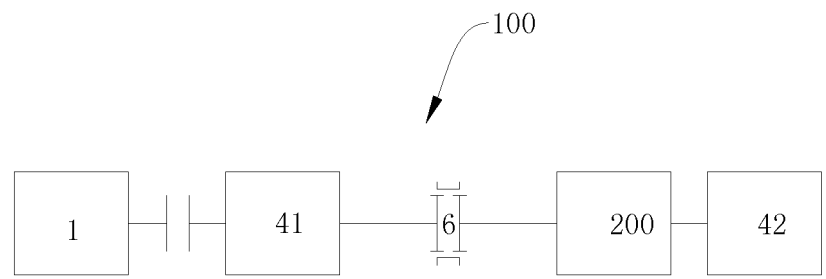
FIG. 1 is a schematic diagram of a power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A power transmission system 100 according to embodiments of the present disclosure will be described in detail below with reference to FIGS. 1-22. The power transmission system 100 is applicable to a vehicle, specifically a hybrid vehicle with an engine unit 1 and a motor generator.

As shown in, for example, FIGS. 1-2 and 17-19, the power transmission system 100 according to embodiments of the present disclosure may include an engine unit 1, a transmission unit 2a, a first motor generator 41, a second motor generator 42, an output unit 5 and a power switching device (e.g., a synchronizer 6, a clutch 9).

The transmission unit 2a is adapted to be selectively coupled with the engine unit 1. The engine unit 1 may selectively output a power generated by the engine unit 1 to the transmission unit 2a via the clutch 9. Alternatively, the transmission unit 2a may also output, for example, a starting torque from the first motor generator 41 to the engine unit 1, so as to start the engine unit 1. In the context of the present disclosure, the phase "the transmission unit 2a is coupled with the engine unit 1" means that the power can be transferred between the engine unit 1 and the transmission unit 2a directly or via other components, so that the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may adopt a four-stroke gasoline or diesel engine. The engine unit 1 may generally include a block, a crank-connecting rod mechanism, a valve mechanism, a supply system, an ignition system, a cooling system, a lubrication system and the like.

The block is an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

The engine unit 1 as well as structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thereby to the first motor generator 41 via the transmission unit 2a, and the first motor generator 41 may generate electricity and convert mechanical energy into electric energy to be stored in an energy storage component such as a battery pack. As another example, the first motor generator 41 may convert electric energy from the battery pack into mechanical energy, and output the mechanical energy to the output unit 5 via the transmission unit 2a to drive the vehicle.

The first motor generator 41 is a motor having functions of both a motor and a generator. As used herein, the term "motor generator" refers to a motor having functions of both a motor and a generator, unless specified otherwise.

The output unit 5 is configured to transmit a power transmitted by the transmission unit 2a to wheels 200 (i.e. at least one of front and rear wheels 210, 220) of the vehicle. The output unit 5 is adapted to output the power from the transmission unit 2a.

The power switching device such as the synchronizer 6 is adapted to enable or interrupt a power transmission between the output unit 5 and the transmission unit 2*a*. In other words, the power switching device may output the power output from the transmission unit 2*a* to at least one of front and rear wheels 210, 220 via the output unit 5, or the power switching device may also disconnect the transmission unit 2*a* from the output unit 5 and the transmission unit 2*a* may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present disclosure, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the types of the operation modes of the vehicle. Therefore, the vehicle may adapt to different operating conditions, thus achieving better fuel economic efficiency while reducing the emissions of harmful gases.

In some embodiments, as shown in FIGS. 1-16, the power switching device is configured as a synchronizer 6, and the synchronizer 6 is adapted to selectively synchronize the output unit 5 and the transmission unit 2*a*, so as to output the power via the output unit 5 to drive the wheels 200 of the vehicle.

Here, the function of the synchronizer 6 may be to synchronize the output unit 5 and the transmission unit 2*a*, i.e. under the action of the synchronizer 6, the output unit 5 and the transmission unit 2*a* may operate synchronously, such that the power from the transmission unit 2*a* may be output with the output unit 5 as a power output terminal. However, when the transmission unit 2*a* and the output unit 5 are not synchronized by the synchronizer 6, the power from the transmission unit 2*a* may not be output to the wheels 200 via the output unit 5 directly.

The synchronizer 6 functions to switch the power. That is, when the synchronizer 6 is in an engaged state, the power from the transmission unit 2*a* may be output via the output unit 5 to drive the wheels 200; and when the synchronizer 6 is in a disengaged state, the transmission unit 2*a* may not transmit the power to the wheels 200 via the output unit 5. In this way, by controlling the synchronizer 6 to switch between the engaged state and the disengaged state, the switching of the drive mode of the vehicle may be realized.

In some embodiments, as shown in FIGS. 2, 6-7, 14, 15, 17, and 18, the transmission unit 2*a* includes a transmission power input part 21*a* and a transmission power output part 22*a*, the transmission power input part 21*a* is selectively engaged with the engine unit 1, so as to transmit the power generated by the engine unit 1. The transmission power output part 22*a* is configured to output the power from the transmission power input part 21*a* to the output unit 5 via the synchronizer 6.

As shown in FIGS. 2, 6, 7, 14, 15, 17, and 18, the transmission power input part 21*a* includes an input shaft (e.g., a first input shaft 21, a second input shaft 22) and a driving gear 25 mounted on the input shaft, the input shaft is selectively engaged with the engine unit 1, so as to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below.

As shown in FIGS. 2, 6, 7, 14, 15, 17, and 18, the transmission power output part 22*a* includes an output shaft 24, and a driven gear 26 mounted on the output shaft 24 and meshed with the driving gear 25 on the input shaft.

As shown in FIGS. 2-5, the output shaft 24 is configured to output at least a part of the power transmitted by the input shaft. Specifically, the output shaft 24 and the input shaft (for example, the first and second input shafts 21, 22) cooperate with each other to transmit the power. For example, the power transmission between the output shaft 24 and the input shaft may be realized by means of the driving gear 25 and the driven gear 26.

The power transmission between the output shaft 24 and the input shaft is not limited to this embodiment. In some embodiments, the power transmission manner between the output shaft 24 and the input shaft may be selected according to practical applications. For example, the power transmission between the output shaft 24 and the input shaft may also be realized by means of a belt transmission mechanism, or a rack and pinion transmission mechanism.

In some embodiments, the output shaft 24 is configured to transmit at least a part of the power on the input shaft. For example, when the power transmission system 100 is in a certain transmission mode, for example, the first motor generator 41 generates electricity, a part of the power on the input shaft may be used for the electricity generating of the first motor generator 41, and the other part of the power on the input shaft may be used to drive the vehicle to run. Certainly, all power on the input shaft may be used for the electricity generating of the first motor generator 41.

In some embodiments, the power transmission between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 is directly connected rigidly with one of the input shaft and the output shaft 24. The direct power transmission has advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has advantages of enabling convenient arrangement and being capable of obtaining the desired transmission ratio by providing a speed changing device and the like.

The output unit 5 may be used as a power output terminal of the output shaft 24 for outputting the power on the output shaft 24. The output unit 5 and the output shaft 24 may rotate differentially (i.e., at a different speed) and not rotate synchronously. In other words, there can be a rotating speed difference between the output unit 5 and the output shaft 24, and the output unit 5 and the output shaft 24 are not connected rigidly with each other.

The synchronizer 6 is disposed on the output shaft 24. As shown in FIGS. 1-6, the synchronizer 6 may include a splined hub 61 and a synchronizing sleeve 62. The splined hub 61 may be fixed on the output shaft 24, the splined hub 61 rotates synchronously with the output shaft 24, the synchronizing sleeve 62 may move in an axial direction of the output shaft 24 relative to the splined hub 61 so as to selectively engage with the output unit 5, such that the output unit 5 rotates synchronously with the output shaft 24. In this way, the power may be transferred from the output unit 5 to the front and/or rear wheels 210, 220, thus driving the wheels 200. However, it should be appreciated by those having ordinary skill in the art that the structure of the synchronizer 6 is not limited to this embodiment.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating conditions of the vehicle, it is possible for the synchronizer 6 to switch from a disengaged state to an engaged state, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, greatly improving the transmission efficiency and reducing the energy loss. Furthermore, no torque engagement of the synchronizer 6 may be achieved, i.e. the radial friction force is much smaller than the average value in the related art or even there is no radial friction force during the engagement of the synchronizer 6.

In some embodiments, the output unit 5 is configured to drive a first pair of wheels. There are a pair of second motor generators 42 configured to drive the first pair of wheels. Further, the power transmission system 100 further includes at least one third motor generator 43 configured to drive a second pair of wheels. The first pair of wheels is one pair of a pair of front wheels 210 and a pair of rear wheels 220, and the second pair of wheels is the other pair of the pair of front wheels 210 and the pair of rear wheels 220. For example, as shown in FIGS. 2-8, the first pair of wheels refers to the front wheels 210 of the vehicle, and the second pair of wheels refers to the rear wheels 220 of the vehicle. It is understood that, in some embodiments, the first pair of wheels can refer to the rear wheels 220 and the second pair of wheels can refer to the front wheels 210.

Therefore, the power transmission system 100 according to embodiments of the present disclosure has four types of power output sources, i.e. the engine unit 1, the first motor generator 41, the second motor generator 42 and the third motor generator 43, in which the engine unit 1, the first motor generator 41 and the second motor generator 42 may be configured to drive one pair of wheels of the vehicle, and the third motor generator 43 may be configured to drive the other pair of wheels of the vehicle. Therefore, the vehicle having the power transmission system 100 is operable as a four-wheel drive vehicle.

Moreover, during the switching of operating conditions of the vehicle, it is possible for the synchronizer 6 to switch from the disengaged state to the engaged state, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by provision of the second motor generator 42 and the third motor generator 43, the second motor generator 42 and the third motor generator 43 may compensate for the torque of the wheels 200, which is indirectly reflected in the output unit 5. That is, the second motor generator 42 and the third motor generator 43 may indirectly adjust the rotating speed of the output unit 5. For example, when the synchronizer 6 switches from the disengaged state to the engaged state, the second motor generator 42 and the third motor generator 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generator 42 and the third motor generator 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

The first motor generator 41 may adjust the rotating speed of the output unit 5 separately. In some embodiments, at least one of the second motor generator 42 and the third motor generator 43 may adjust the rotating speed of the output unit 5 separately. Further alternatively, the first motor generator 41, the second motor generator 42 and the third motor generator 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generator 42 and the third motor generator 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments, as shown in FIGS. 2-9, there are a plurality of the input shafts, i.e. two or more input shafts. The input shafts are coaxial and fitted over one another sequentially. For example, if there are N input shafts, the Kth input shaft is fitted over the (K−1)th input shaft, where N≥K≥2, and central axes of the N input shafts coincide with each other.

In the example shown in FIGS. 2-5 and 9-19, when there are two input shafts, i.e. the first input shaft 21 and the second input shaft 22, the second input shaft 22 is fitted over the first input shaft 21 and central axes of the two input shafts coincide with each other. As another example, in the example shown in FIG. 6, when there are three input shafts, i.e. the first input shaft 21, the second input shaft 22 and a third the input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmission, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIGS. 2-6 and 9, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

In some embodiments, a plurality of driven gears 26 are fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present disclosure is not limited to this embodiment. For example, the number of the driving gears 25 on each input shaft is not limited to one, and accordingly a plurality of driven gears 26 are fixed on the output shaft 24 to form a plurality of gears.

As shown in FIGS. 2-6, the driven gears 26 are meshed with the driving gears 25 on the input shafts respectively. In one embodiment, the number of the driven gears 26 may be the same as that of the input shafts. For example, when there are two driven gears 26, there are two input shafts, such that the two driven gears 26 may be meshed with the driving gears 25 on the two input shafts to transmit the power, so as to make the two pairs of gears form two gears for power transmission.

In some embodiments, three or more input shafts may be provided according to the power transmission requirements, and each input shaft may be provided with one driving gear 25. Therefore, the larger the number of the input shafts, the larger the number of the gears is, and the wider range of the transmission ratio of the power transmission system 100 is, so as to adapt to the power transmission requirements of various vehicles.

In some embodiments, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

In some embodiments, the first input shaft 21 may be supported by bearings. In order to ensure the ride comfort of the first input shaft 21 during the power transmission, preferably, a plurality of bearings is provided and may be disposed in an axial direction of the first input shaft 21 at a position not influencing the assembly of other components. Similarly, the second input shaft 22 may also be supported by bearings.

Further, in some embodiments, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is coupled with the input terminal 313 of the dual clutch 31. Specifically, the engine unit 1 may be coupled with the input terminal 313 of the dual clutch 31 via for example, a flywheel, a damper, or a torsion plate.

The first output terminal 311 of the dual clutch 31 is coupled with the first input shaft 21, such that the first output terminal 311 rotates synchronously with the first input shaft 21. The second output terminal 312 of the dual clutch 31 is coupled with the second input shaft 22, such that the second output terminal 312 rotates synchronously with the second input shaft 22.

The input terminal 313 of the dual clutch 31 may be a shell of the dual clutch 31, and the first output terminal 311 and the second output terminal 312 of the dual clutch 31 may be two driven discs. Generally, the shell is disconnected from the two driven discs, i.e. the input terminal 313 is disconnected from the first output terminal 311 and the second output terminal 312. When one driven disc needs to be engaged, the shell is controlled to engage with the corresponding driven disc to rotate synchronously with the driven disc, i.e. the input terminal 313 is engaged with one of the first output terminal 311 and the second output terminal 312, such that the power transmitted from the input terminal 313 may be output via one of the first output terminal 311 and the second output terminal 312. Typically, the shell is engaged with one driven disc at a time.

It should be appreciated by those having ordinary skill in the art that the engagement of the dual clutch 31 is influenced by a control strategy. The control strategy may be set according to the desired power transmission mode, such that it is possible to switch between a mode in which the input terminal 313 is disconnected from the first output terminal 311 and the second output terminal 312 and a mode in which the input terminal 313 is engaged with one of the first output terminal 311 and the second output terminal 312.

In some embodiments, as shown in FIGS. 2-7, since the input shafts have a coaxial structure and each input shaft is provided with only one driving gear 25, the transmission unit 2a has two different gears, and the engine unit 1 may output the power to the output unit 5 via the two gears, while the synchronizer 6 is always in the engaged state, i.e. engages the output shaft 24 with the output unit 5.

During the gear shift, the synchronizer 6 may not need to be first disengaged and then move axially to engage with other gears. According to embodiments of the present disclosure, only the engagement/disengagement of the dual clutch 31 needs to be controlled, while the synchronizer 6 can remain in the engaged state. In this way, when the engine unit 1 outputs the power to the output unit 5, only one gear shift actuating element, i.e. the dual clutch 31 needs to be controlled, without requiring to control the synchronizer 6, thus simplifying the control strategy greatly, reducing the number of engagement/disengagement times of the synchronizer 6, and extending the life of the synchronizer 6.

In some embodiments, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, in some embodiments, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
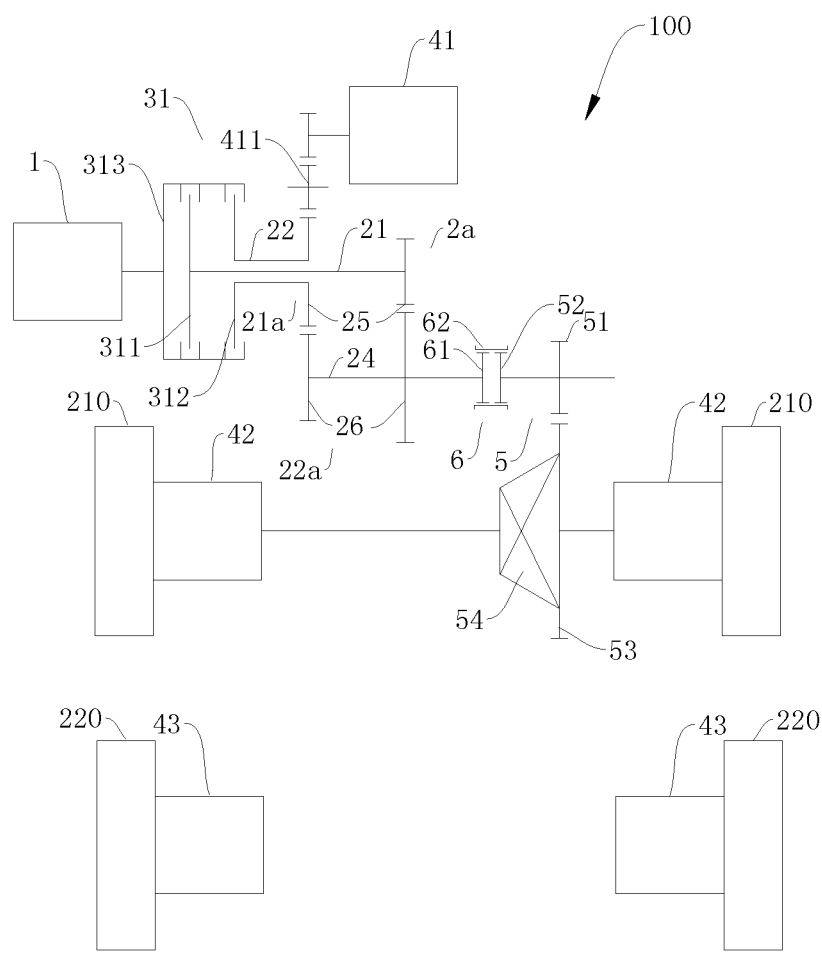
FIG. 2 is a schematic view of a power transmission system according to an embodiment of the present disclosure.
Figure 3:
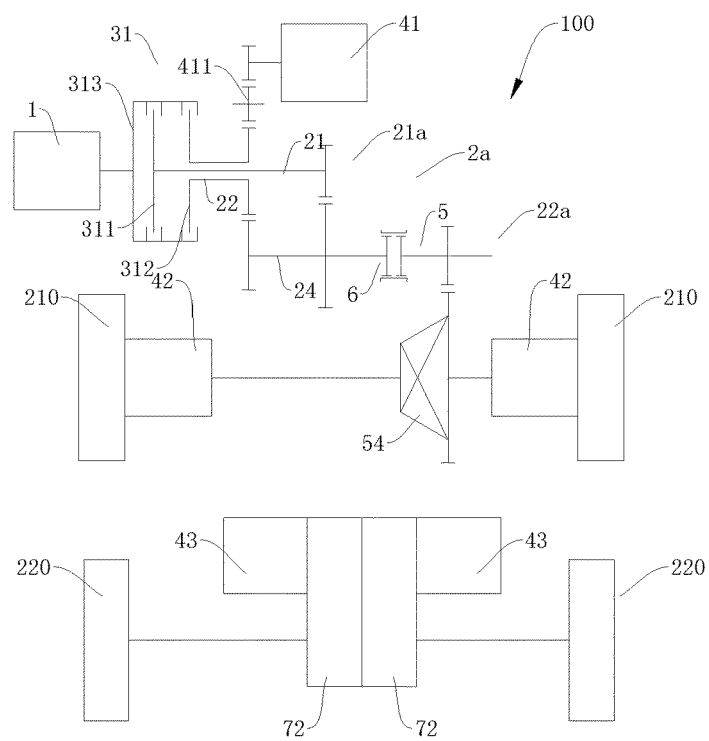
FIG. 3 is a schematic view of a power transmission system according to another embodiment of the present disclosure.

In order to facilitate the spatial arrangement, in some embodiments, the first motor generator 41 may transmit the power via an intermediate gear 411. In some embodiments, as shown in FIGS. 2-3, indirect power transmission between the first motor generator 41 and the driving gear 25 on the first input shaft 21 via the intermediate gear 411 is performed. As another example, in the example shown in FIG. 2, indirect power transmission between the first motor generator 41 and the driving gear 25 on the second input shaft 22 via the intermediate gear 411 is performed.

However, the present disclosure is not limited to this embodiment. In some embodiments, the first motor generator 41 is configured to connect with one of the first input shaft 21 and the output shaft 24. In some embodiments, the first motor generator 41 is configured to directly connect with the first input shaft 21. In some embodiments, the first motor generator 41 is configured to directly connect with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
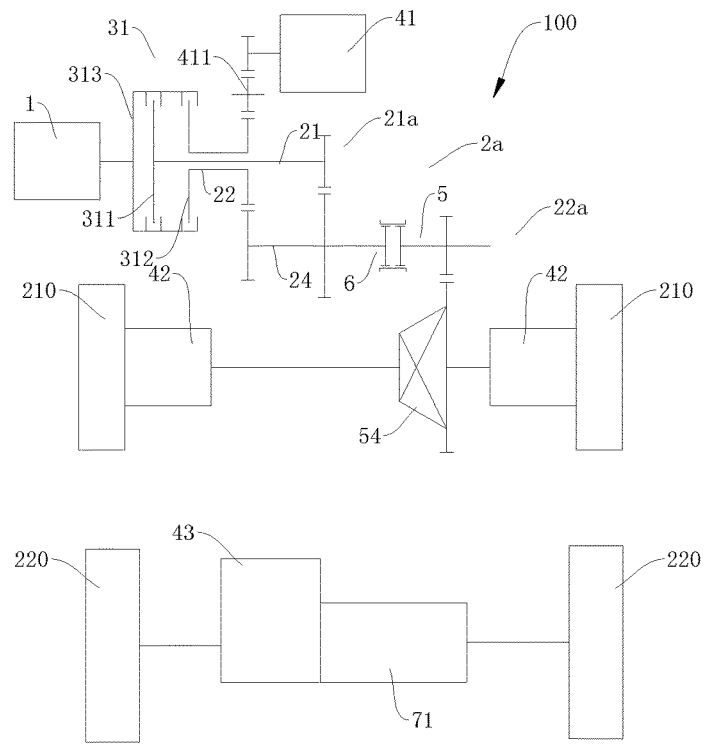
FIG. 4 is a schematic view of a power transmission system according to still another embodiment of the present disclosure.

In one embodiment, as shown in FIG. 4, the first motor generator 41 is arranged coaxially with the first input shaft 21, and the first motor generator 41 is arranged coaxially with the engine unit 1, i.e. a rotation axis of a rotor of the first motor generator 41 substantially coincides with a rotation axis of a crankshaft of the engine unit 1. Therefore, the power transmission system 100 is more compact in structure.

In some embodiments, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52, such that a rigid connection is formed between the output shaft 24, the synchronizer 6 and the output unit 5, so as to rotate the output shaft 24, the synchronizer 6 and the output unit 5 synchronously.

In order to reduce the intermediate transmission components, to reduce the energy loss, and to enhance the transmission efficiency of the power transmission system 100, in some embodiments, as shown in FIGS. 2-6, the output gear 51 may be a driving gear of a final drive and directly meshed with a driven gear 53 of the final drive to output the power, so as to drive the wheels 200. However, the present disclosure is not limited to this embodiment, and other intermediate transmission components may also be disposed between the output gear 51 and the final drive.

In some embodiments, as shown in FIGS. 2-10, a differential 54 is disposed between the first pair of wheels such as the front wheels 210. The differential 54 cooperates with the output unit 5 for power transmission. In some embodiments, the differential 54 is provided with the driven gear 53 thereon, and the output gear 51 is the driving gear of the final drive meshed with the driven gear 53, such that the power may be transferred to the two front wheels 210 via the driving gear of the final drive, the driven gear 53 of the final drive and the differential 54 sequentially.

The function of the differential 54 is to distribute the power to the two front wheels 210 reasonably. The differential 54 may be a gear differential, a mandatory locking differential, or the Torsen differential, which may be selected according to different vehicles.

Figure 5:
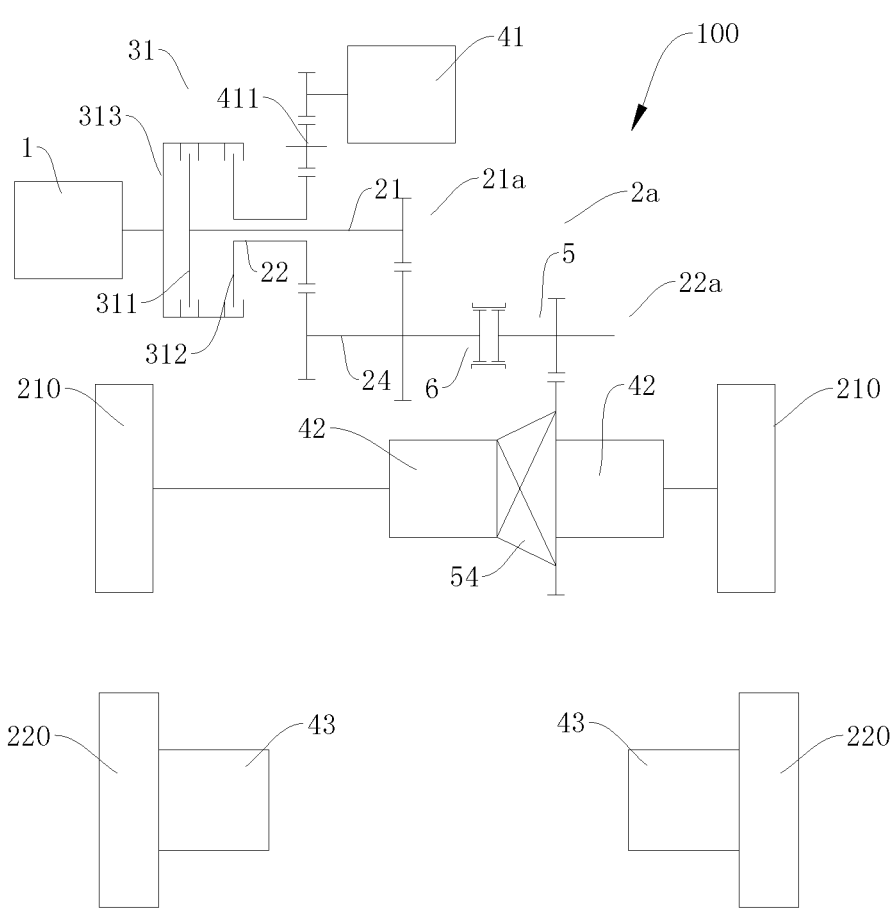
FIG. 5 is a schematic view of a power transmission system according to yet another embodiment of the present disclosure.
Figure 6:
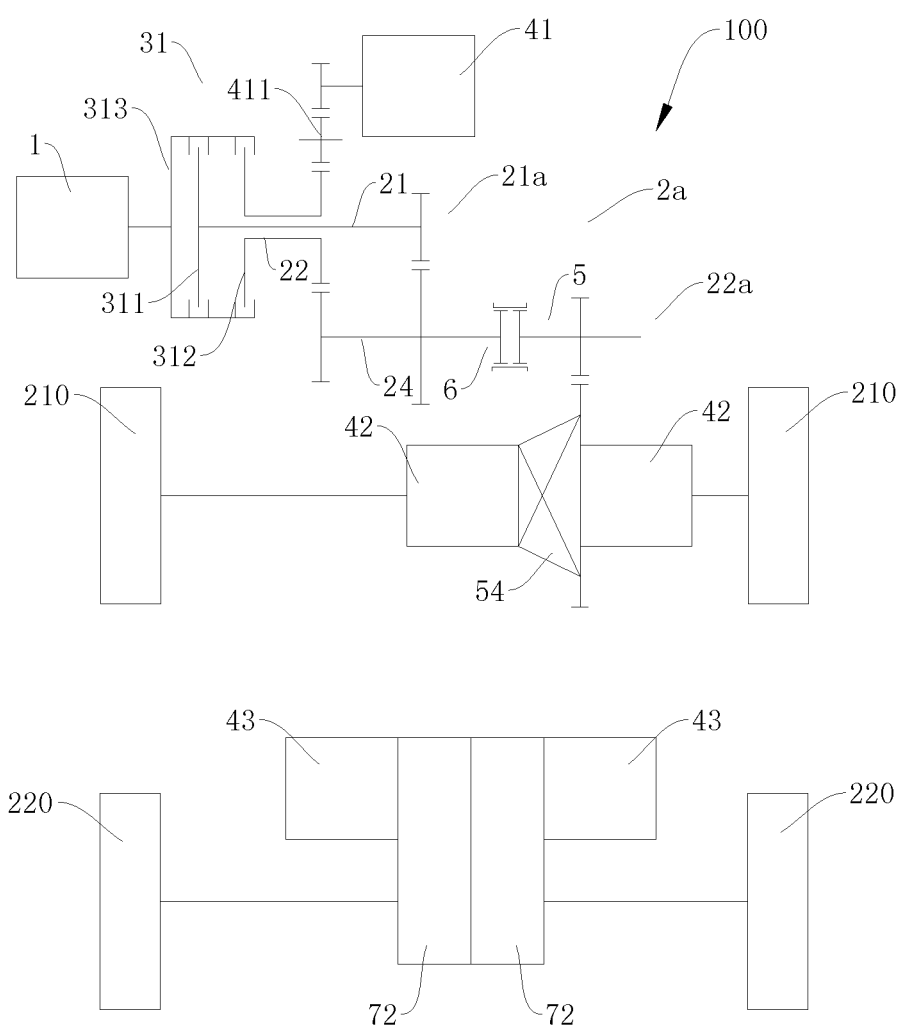
FIG. 6 is a schematic view of a power transmission system according to yet another embodiment of the present disclosure.
Figure 7:
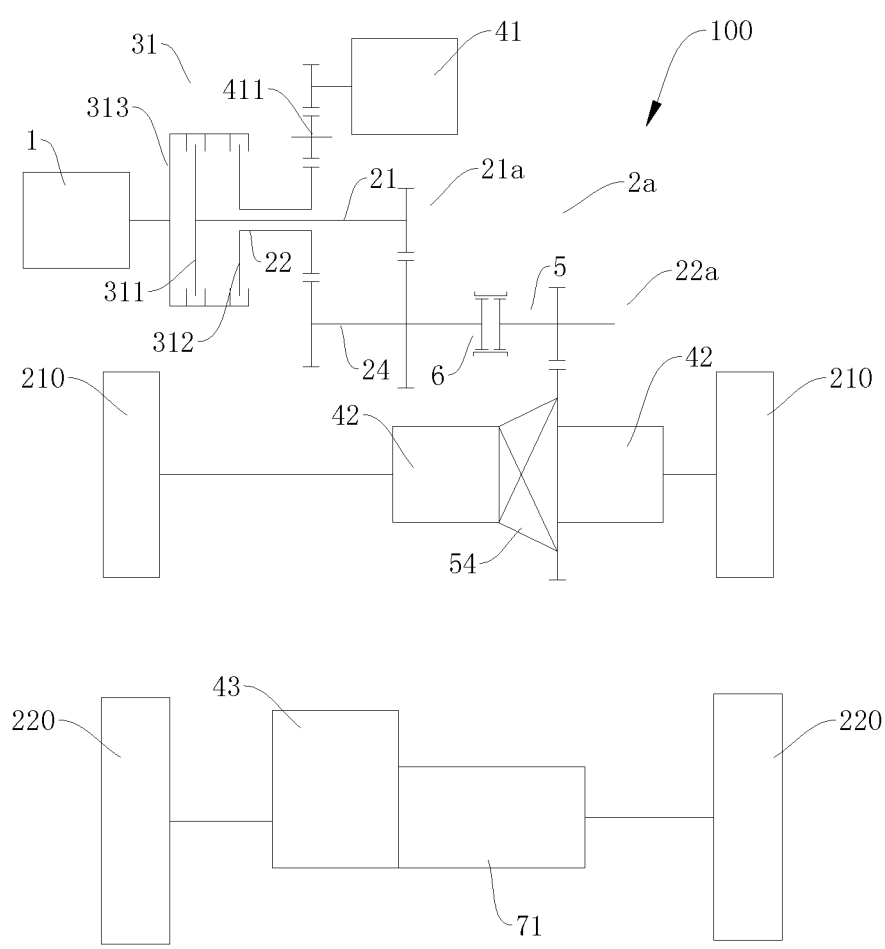
FIG. 7 is a schematic view of a power transmission system according to yet another embodiment of the present disclosure.
Figure 10:
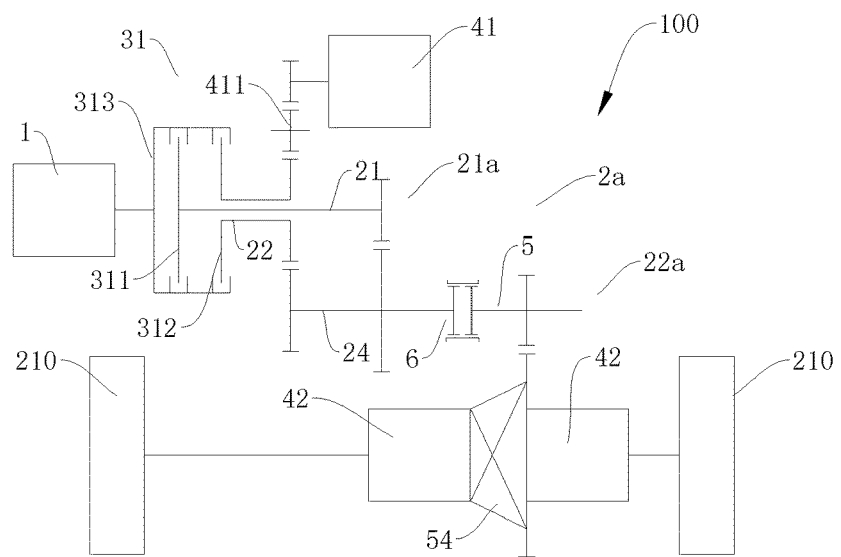
FIG. 10 is a schematic view of a power transmission system according to yet another embodiment of the present disclosure.

In some embodiments, as shown in FIGS. 5-7 and 10, a pair of second motor generators 42 is disposed at two sides of the differential 54 back to back. For example, a pair of second motor generators 42 is disposed at two sides of the differential 54 and integrally formed with the differential 54. In other words, the left second motor generator 42 is disposed between a left half shaft and the differential 54, and the right second motor generator 42 is disposed between a right half shaft and the differential 54. Specifically, the power transmission system 100 in FIGS. 5-7 is operable in a four-wheel drive mode, and the power transmission system 100 in FIG. 10 is operable in a two-wheel drive mode. When referring to "motor generators are disposed on two sides of the differential 54 back to back," it means that the motor generators are disposed at two sides of the differential 54 respectively and integrally formed with the differential 54.

Figure 9:
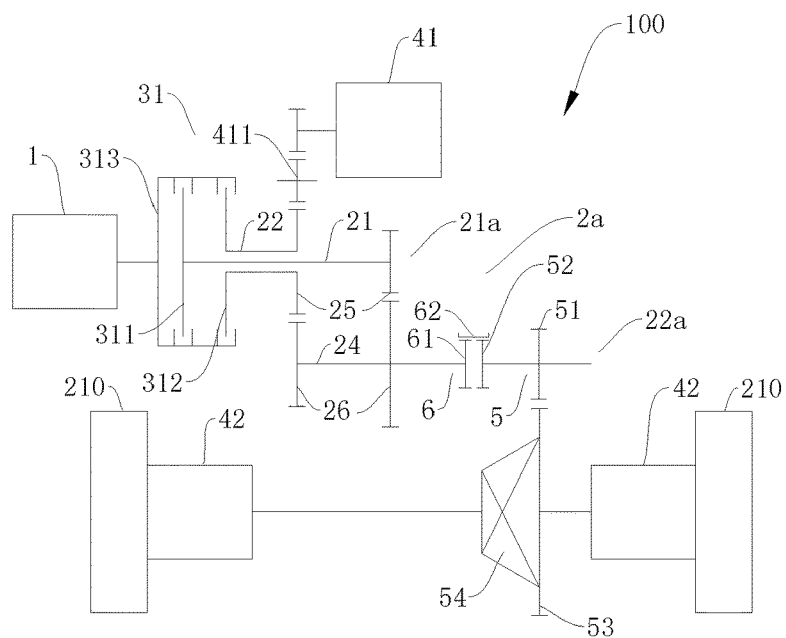
FIG. 9 is a schematic view of a power transmission system according to yet another embodiment of the present disclosure.

In some embodiments, as shown in FIGS. 2-4 and 9, the second motor generator 42 is a wheel-side motor. In other words, one of the second motor generators 42 is disposed at an inner side of the left front wheel and the other of the second motor generators 42 is disposed at an inner side of the right front wheel, and the second motor generator 42 may transfer the power to a hub of a corresponding wheel via a gear mechanism. Specifically, the power transmission system 100 in FIGS. 2-4 is operable in a four-wheel drive mode, and the power transmission system 100 in FIG. 9 is operable in a two-wheel drive mode.

In some embodiments, two third motor generators 43 are provided, and the third motor generators 43 are a wheel-side motor, as shown in FIGS. 2 and 5. In other words, in the example shown in FIGS. 2 and 5, one of the third motor generators 43 is disposed at an inner side of the left rear wheel, and the other of the third motor generators 43 is disposed at an inner side of the right rear wheel, and the third motor generator 43 may transfer the power to a corresponding rear wheel via a gear mechanism.

In some embodiments, one third motor generator 43 is provided, and the third motor generator 43 drives the second pair of wheels via a first speed changing mechanism 71. Particularly, the first speed changing mechanism 71 is a speed reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the second pair of wheels may be connected with each other via an axle which may have an integral structure. The third motor generator 43 may directly drive the integral axle via the first speed changing mechanism 71, so as to drive the two wheels to rotate synchronously.

In some embodiments, two third motor generators 43 are provided, and each third motor generator 43 drives one of the second pair of wheels via a second speed changing mechanism 72. Particularly, the second speed changing mechanism 72 is a speed reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the two wheels in the second pair may be connected with the corresponding third motor generators 43 and the corresponding second speed changing mechanisms 72 via two half axles respectively. In other words, one of the third motor generators 43 may drive a corresponding half axle via one of the second speed changing mechanisms 72, so as to drive the wheel at an outer side of the half axle to rotate.

Figure 11:
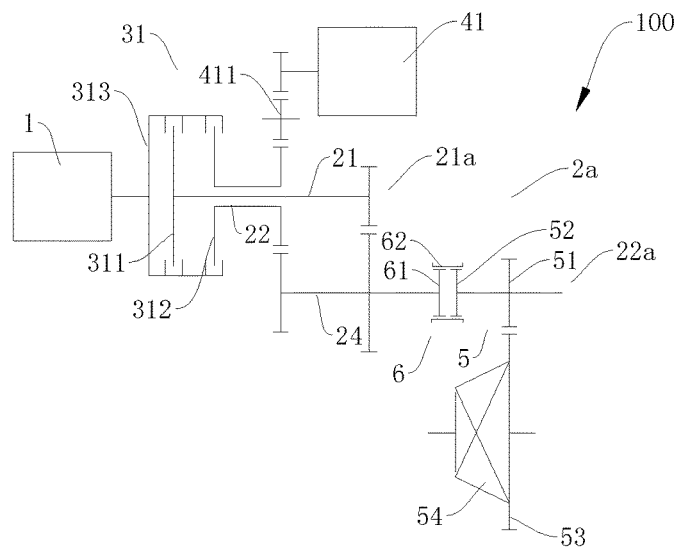
FIG. 11 is a schematic view of a power transmission system according to yet another embodiment of the present disclosure.
Figure 11:
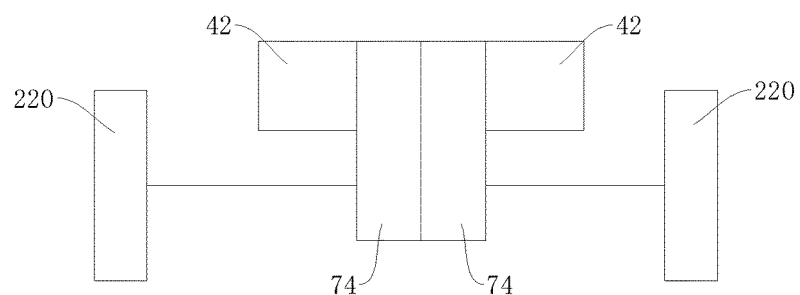
Figure 12:
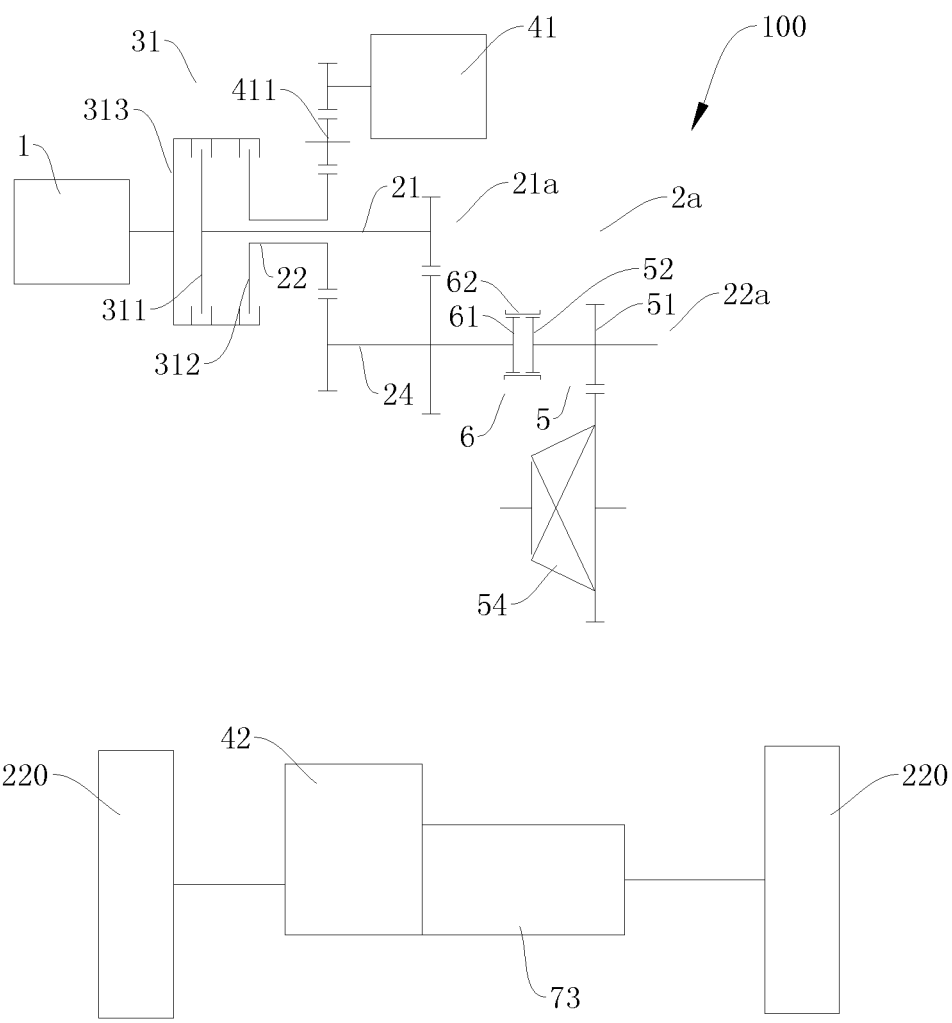
FIG. 12 is a schematic view of a power transmission system according to yet another embodiment of the present disclosure.
Figure 13:
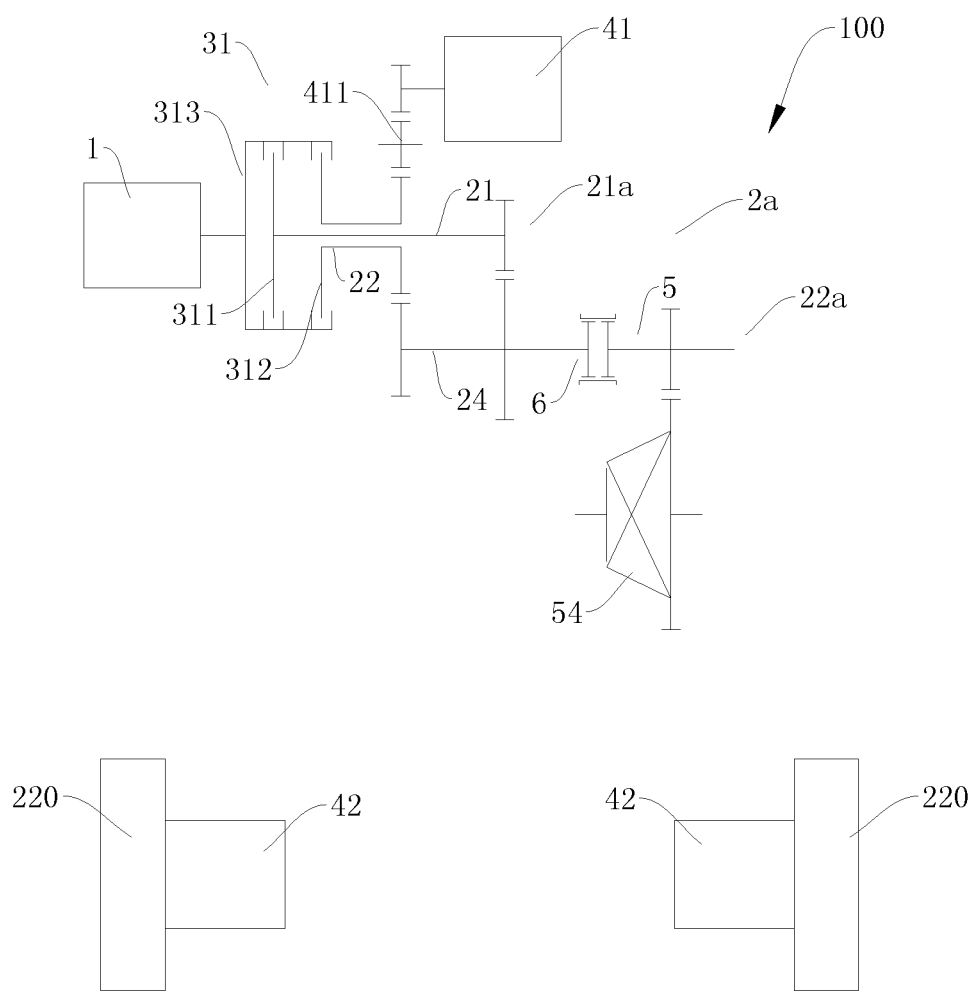
FIG. 13 is a schematic view of a power transmission system according to yet another embodiment of the present disclosure.

In some embodiments, as shown in FIGS. 9-10, the power transmission system 100 is in a two-wheel drive mode. In the example shown in FIG. 9, the output unit 5 drives the front wheels 210, and the second motor generator 42 is a wheel-side motor and is configured to drive the front wheels 210. In the example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. In some embodiments, as shown in FIGS. 11-13, the power transmission system 100 is operable in a four-wheel drive mode. In the example shown in FIG. 11, the output unit 5 drives the front wheels 210, two second motor generators 42 are provided, and each second motor generator 42 drives one rear wheel 220 via one fourth speed changing mechanism 74. In the example shown in FIG. 12, the output unit 5 drives the front wheels 210, one second motor generator 42 is provided, and the second motor generator 42 drives the rear wheels 220 via one third speed changing mechanism 73. In the example shown in FIG. 13, the output unit 5 drives the front wheels 210, two second motor generators 42 are provided and are a wheel-side motor, which are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments, the power transmission system 100 may also include a battery pack 300. The battery pack 300 is connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery pack 300, and electric energy recovered by the second motor generator 42 and the third motor generator 43 during the braking may also be supplied to and stored in the battery pack 300. When the vehicle is operated in an EV mode, the battery pack 300 may supply electric energy to at least one of the first motor generator 41, the second motor generator 42 and the third motor generator 43. It should be appreciated by those having ordinary skill in the art that the dotted lines shown in FIG. 8 indicates that the battery pack 300 is electrically connected with the first motor generator 41, the second motor generator 42 and the third motor generator 43 respectively.

Figure 8:
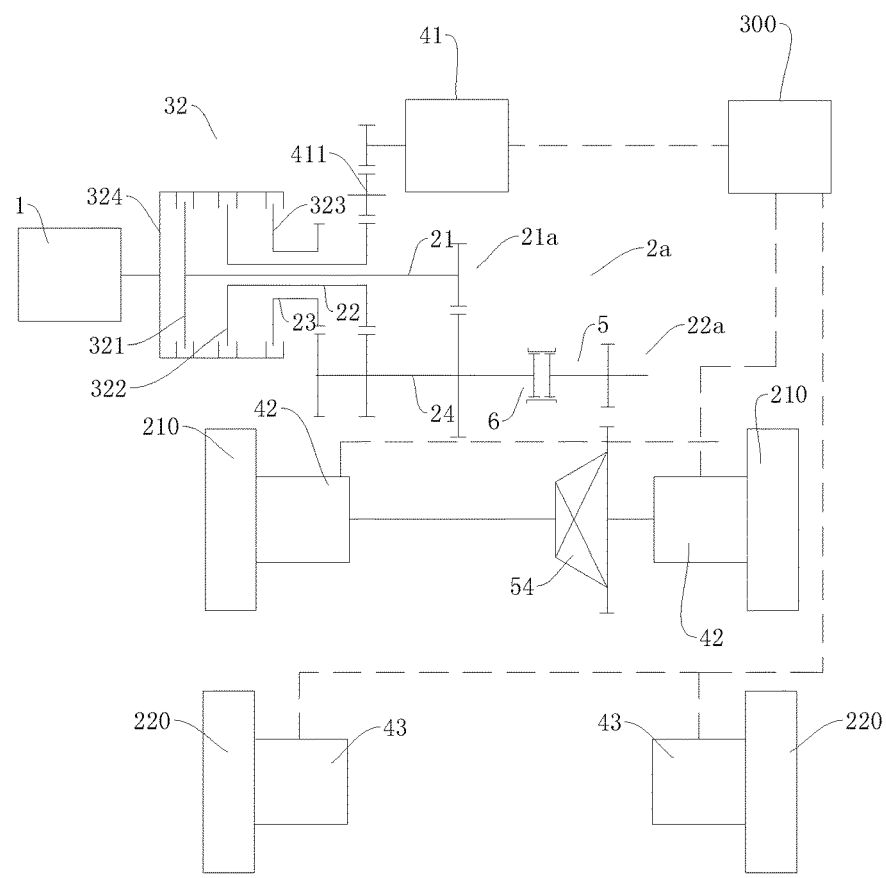
FIG. 8 is a schematic view of a power transmission system according to yet another embodiment of the present disclosure.

In some embodiments, as shown in FIG. 8, the power transmission system 100 comprises input shafts which include three shafts, e.g. the first input shaft 21, the second input shaft 22 and the third input shaft 23, in which the second input shaft 22 is fitted over the first input shaft 21, and the third input shaft 23 is fitted over the second input shaft 22.

In this embodiment, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

In some embodiments, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, 323, or may be disconnected with the first, second and third output terminals 321, 322, 323. It should be appreciated by those having ordinary skill in the art that the operation principle of the triple clutch 32 is similar to that of the dual clutch 31, so the detailed description thereof will be omitted here.

It should be noted that, in such a variation, other parts such as the power transmission manner between the first motor generator 41 and the first input shaft 21 or the output shaft 24 as well as the position and drive mode of the second motor generator 42 and the third motor generator 43, are similar to those described with respect to the dual clutch 31, so the detailed description thereof will be omitted here.

Figure 14:
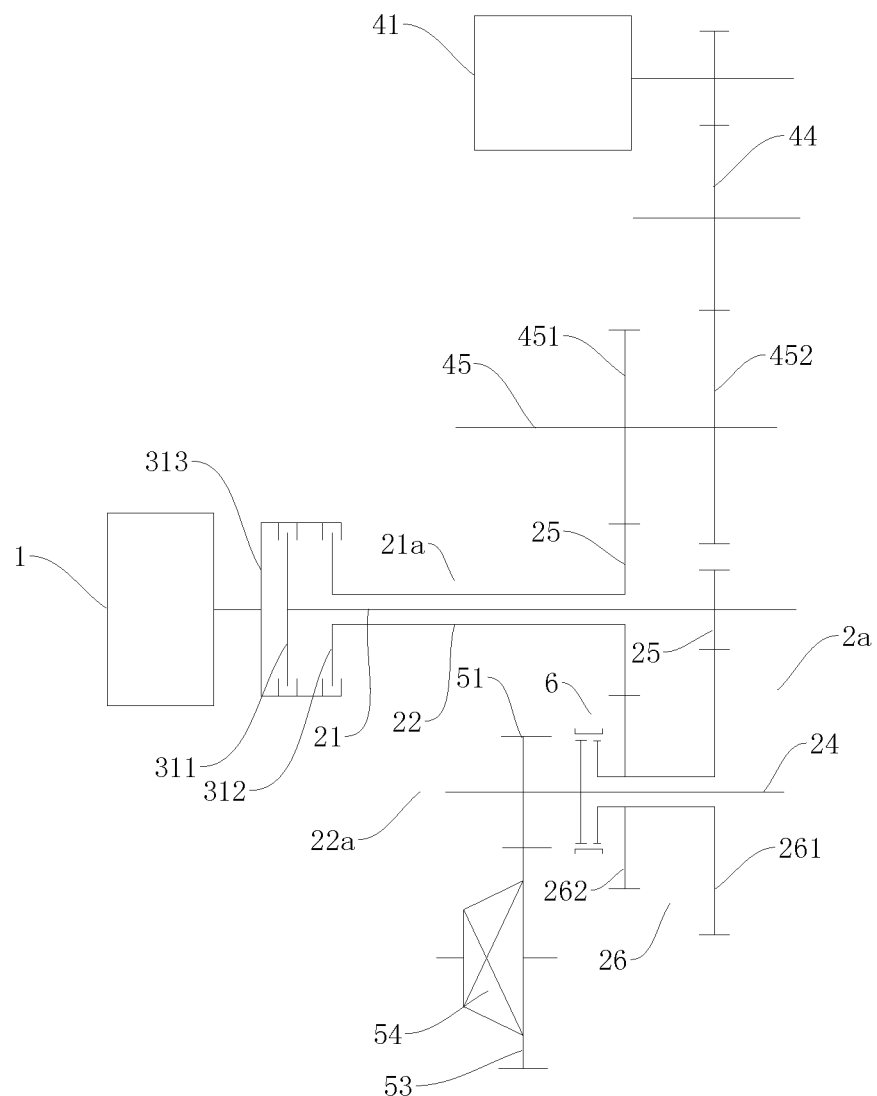
FIG. 14 is a schematic view of a power transmission system according to yet another embodiment of the present disclosure.
Figure 15:
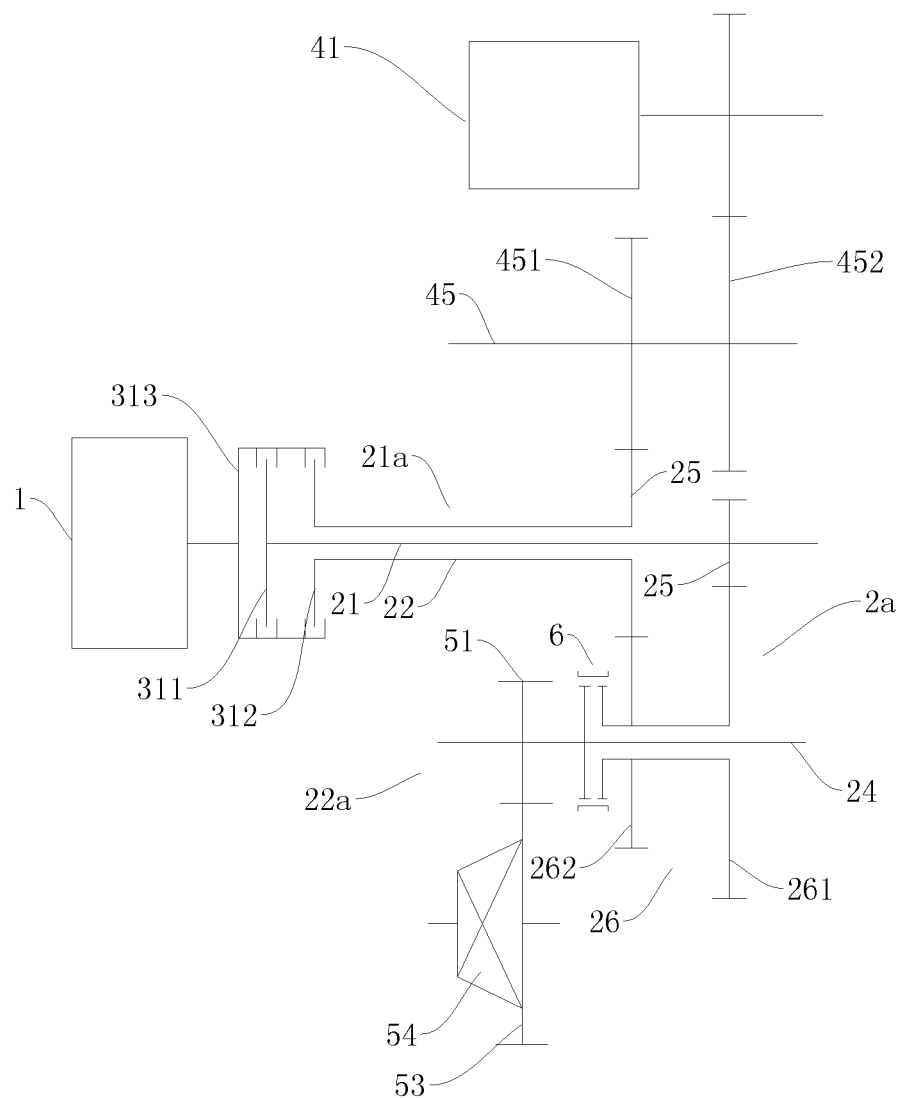
FIG. 15 is a schematic view of a power transmission system according to yet another embodiment of the present disclosure.
Figure 16:
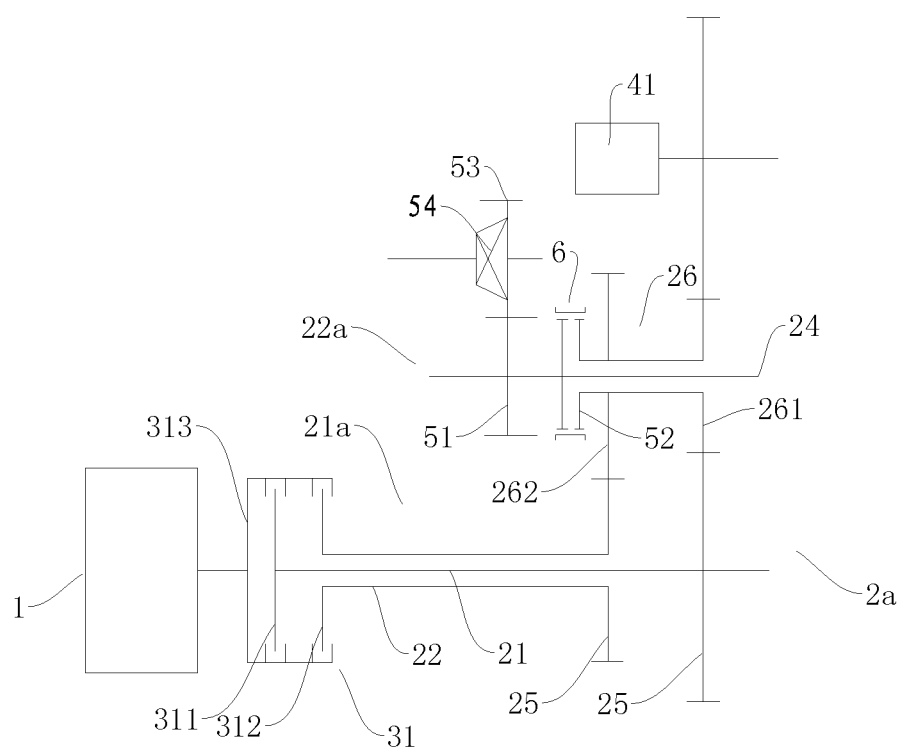
FIG. 16 is a schematic view of a power transmission system according to yet another embodiment of the present disclosure.

In some embodiments, as shown in FIGS. 14-16, in this power transmission system 100 includes a driven gear 26 which is configured as a linked gear, and the linked gear 26 is capable of rotating differentially relative to the output shaft. For example, the linked gear 26 is freely fitted over the output shaft 24. The synchronizer 6 is fixed on the output shaft 24 and may be selectively engaged with the linked gear 26.

In this embodiment, as shown in FIGS. 14-16, specifically, the power transmission system 100 may include an engine unit 1, a plurality of input shafts, an output shaft 24, an output unit 5 (e.g., the driving gear 51 of the final drive), a synchronizer 6 and a first motor generator 41.

The power transmission system 100 in such a variation differs from the power transmission system 100 shown in FIGS. 2-13 in that the driven gear 26 is a linked gear and freely fitted over the output shaft 24, the output unit 5 is fixed on the output shaft 24, and the synchronizer 6 is configured to engage with the linked gear. In this embodiment, the arrangement of the first motor generator 41 slightly differs from that of the first motor generator 41 in the power transmission system 100 shown in FIGS. 2-13.

In some embodiments, as shown in FIGS. 14-16, a plurality of input shafts is provided, the input shafts is provided with the driving gears 25 thereon. The linked gear 26 is freely fitted over the output shaft 24. The linked gear 26 has a plurality of gear parts (for example, the first gear part 261, and the second gear part 262), and the gear parts are meshed with the driving gears 25 on the input shafts respectively.

As shown in FIGS. 14-16, the output unit 5 is configured to output the power from the output shaft 24. For example, the output unit 5 is fixed on the output shaft 24. In one embodiment, by way of example and without limitation, the output unit 5 may include the driving gear 51 of the final drive.

The synchronizer 6 is disposed on the output shaft 24. The synchronizer 6 is configured to selectively engage with the linked gear 26, so as to output the power via the output unit 5 to drive the wheels of the vehicle. The power transmission between the first motor generator 41 and one of the input shaft and the output shaft 24 may be direct or indirect.

In this embodiment, the function of the synchronizer 6 is substantially the same as that of the synchronizer 6 shown in FIGS. 2-13, except that the synchronizer 6 in this embodiment is configured to engage the linked gear 26 with the output shaft 24, while the synchronizer 6 shown in FIGS. 2-13 is configured to engage the output unit 5 with the output shaft 24.

Specifically, in this embodiment, the function of the synchronizer 6 is to synchronize the linked gear 26 and the output shaft 24, i.e. after the synchronization of the synchronizer 6, the linked gear 26 and the output shaft 24 operate synchronously, so as to output the power from at least one of the engine unit 1 and the first motor generator 41 with the output unit 5 as a power output terminal. When the linked gear 26 and the output shaft 24 are not synchronized by the synchronizer 6, the power from at least one of the engine unit 1 and the first motor generator 41 may not be directly output to the wheels 200 via the output unit 5.

In these embodiments, the synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear 26 with the rotating speed of the output shaft 24 as a target speed, so as to match the speed of the linked gear 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments, the input shafts are coaxial and fitted over one another, each input shaft is provided with one driving gear 25. Specifically, in one embodiment, the input shafts include a first input shaft 21 and a second input shaft 22, and each input shaft is provided with one driving gear 25. The linked gear 26 is a double-linked gear, the double-linked gear 26 has a first gear part 261 and a second gear part 262, and the first gear part 261 and the second gear part 262 are meshed with two driving gears 25 respectively.

A dual clutch 31 may be disposed between the engine unit 1 and the first and second input shafts 21, 22, which is similar to the dual clutch 31 in the power transmission system 100 shown in FIGS. 2-13. Alternatively, the dual clutch 31 may be provided with a damping structure thereon, for example, the damping structure may be arranged between a first output terminal and an input terminal of the dual clutch 31, so as to adapt to start the vehicle at a low gear.

As shown in FIGS. 14-16, direct or indirect power transmission between an output terminal of the first motor generator 41 and one driving gear is performed.

For example, the power transmission system 100 in this embodiment further includes an intermediate shaft 45. A first intermediate shaft gear 451 and a second intermediate shaft gear 452 are fixed on the intermediate shaft 45. One of the first and second intermediate shaft gears 451, 452 is meshed with one driving gear 25, for example, in the example shown in FIGS. 14-15, the first intermediate shaft gear 451 is meshed with the driving gear 25 on the second input shaft 22, however, the present disclosure is not limited to this embodiment.

In some embodiments, direct power transmission between the output terminal of the first motor generator 41 and one of the first and second intermediate shaft gears 451, 452 or indirect power transmission between the output terminal of the first motor generator 41 and one of the first and second intermediate shaft gears 451, 452 via an intermediate idler 44 is performed. For example, in the example shown in FIG. 14, indirect power transmission between the output terminal of the first motor generator 41 and the second intermediate shaft gear 452 via an intermediate idler 44 is performed. As another example, in the example shown in FIG. 15, the output terminal of the first motor generator 41 is directly meshed with the second intermediate shaft gear 452 for power transmission.

As shown in FIG. 16, the output terminal of the first motor generator 41 is directly meshed with one gear part of the linked gear 26, for example, the output terminal of the first motor generator 41 is directly meshed with the first gear part 261 for power transmission.

However, it should be appreciated by those having ordinary skill in the art that, the present disclosure is not limited to this embodiment. The position of the first motor generator 41 may be designed according to practical requirements. For example, the position of the first motor generator 41 may be the same as that described above, or may be that shown in FIGS. 2-13, which will not be described in detail here.

As shown in FIGS. 14-15, the first gear part 261 inputs a torque to the engine unit 1 separately, and the second gear part 262 may input a torque to at least one of the engine unit 1 and the first motor generator 41.

As shown in FIGS. 14-16, an engagement gear ring 52 is fixed at a side of the linked gear 26 facing the synchronizer 6, and the synchronizer 6 is adapted to engage with the engagement gear ring 52, such that the linked gear 26 is connected rigidly with the output shaft 24 so as to rotate synchronously with the output shaft 24.

In some embodiments, three input shafts are provided. The triple clutch and three input shafts are described above and shown in FIG. 8, so detailed description thereof will be omitted here. In some embodiments, the linked gear 26 is a triple-linked gear. The linked gear 26 has a first gear part 261, a second gear part 262 and a third gear part 263, and the first gear part 261, the second gear part 262 and the third gear part 263 are configured to mesh with the three driving gears 25 on the three input shafts respectively.

Figure 21:
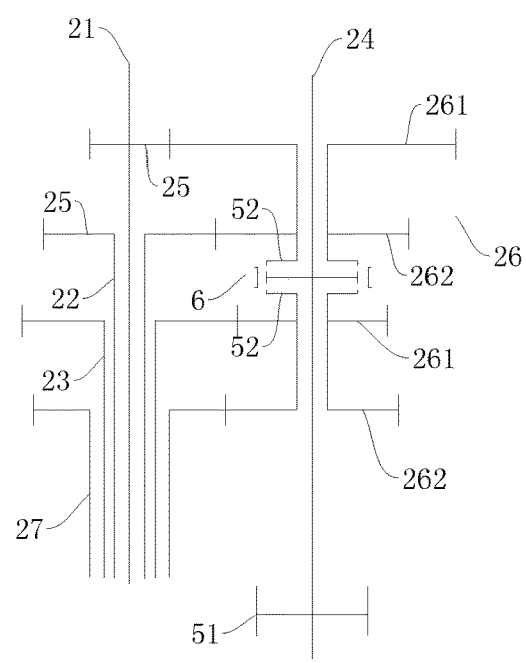
FIG. 21 is a schematic view of a power transmission system according to yet another embodiment of the present disclosure.

In some embodiments, as shown in FIG. 21, four input shafts are provided, i.e. the plurality of the input shafts includes a first input shaft 21, a second input shaft 22 fitted over the first input shaft 21, and a third input shaft 23 fitted over the second input shaft 22; and a fourth input shaft 27 fitted over the third input shaft 23. Two double-linked gears 26 are provided and each double-linked gear has a first gear part 261 and a second gear part 262, and the first gear part 261 and the second gear part 262 are meshed with the corresponding driving gears 25 respectively, i.e. four gears parts are meshed with four driving gears 25 on the four input shafts respectively. The synchronizer 6 is disposed between the two double-linked gears 26 and configured to selectively engage with the one of the double-linked gears 26. It can be understand that, the synchronizer 6 may disengage with both of the two double-linked gears 26.

In some embodiments, as shown in FIG. 21, a quadruple clutch is disposed between the engine unit 1 and the four input shafts. The quadruple clutch includes an input terminal coupled with the engine unit 1, a first output terminal coupled with the first input shaft 21, a second output terminal coupled with the second input shaft 22, a third output terminal coupled with the third input shaft 23, and a fourth output terminal coupled with the fourth input shaft 27. However, it is appreciated that the connecting manner between the engine unit 1 and the input shafts is not limited to this embodiment.

In some embodiments, the linked gear 26 is in such a variation which differs from the power transmission system 100 shown in FIGS. 2-13 in that the driven gear 26 is a linked gear and freely fitted over the output shaft 24, the output unit 5 is fixed on the output shaft 24, and the synchronizer 6 is configured to engage with the linked gear 26 and the output shaft 24. In this embodiment, the power transmission system 100 may include a second motor generator 42 and a third motor generator 43, arrangements of the second motor generator 42 and the third motor generator 43 are substantially the same as that of the power transmission system 100 shown in FIGS. 2-13.

Figure 17:
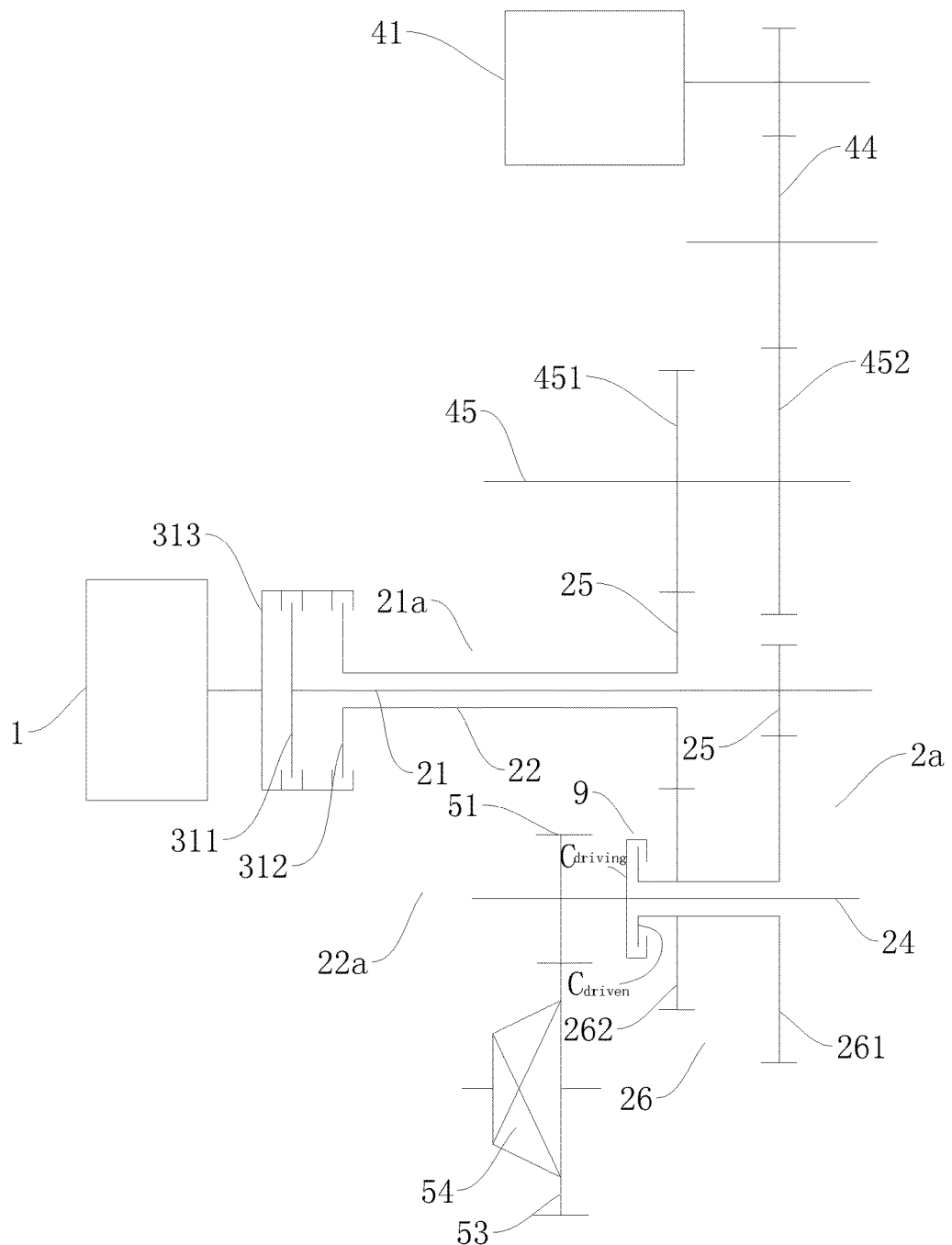
FIG. 17 is a schematic view of a power transmission system according to yet another embodiment of the present disclosure.
Figure 18:
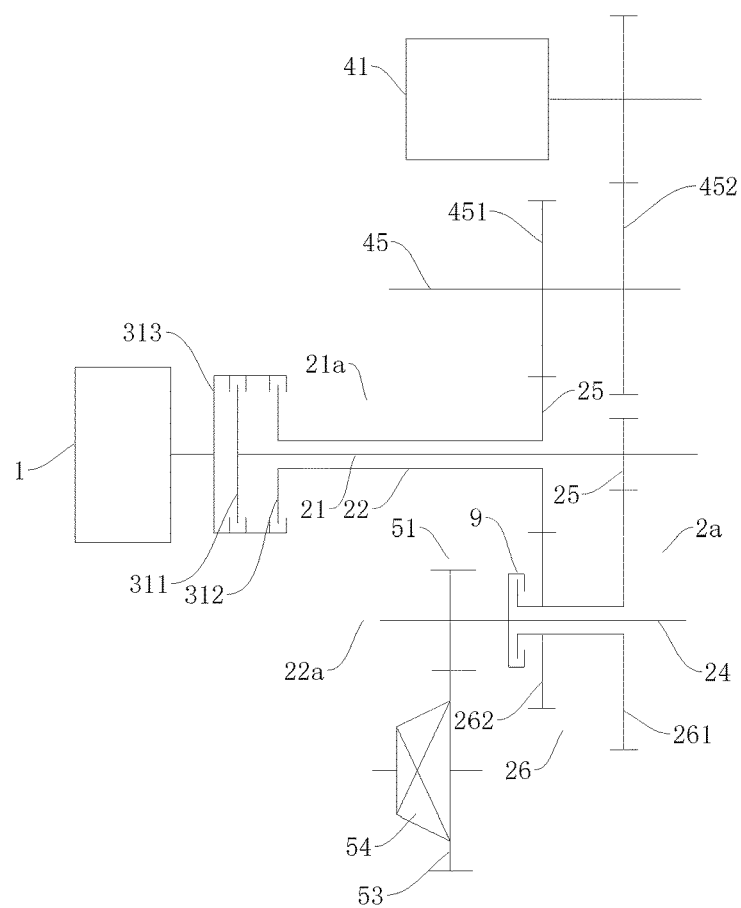
FIG. 18 is a schematic view of a power transmission system according to yet another embodiment of the present disclosure.
Figure 19:
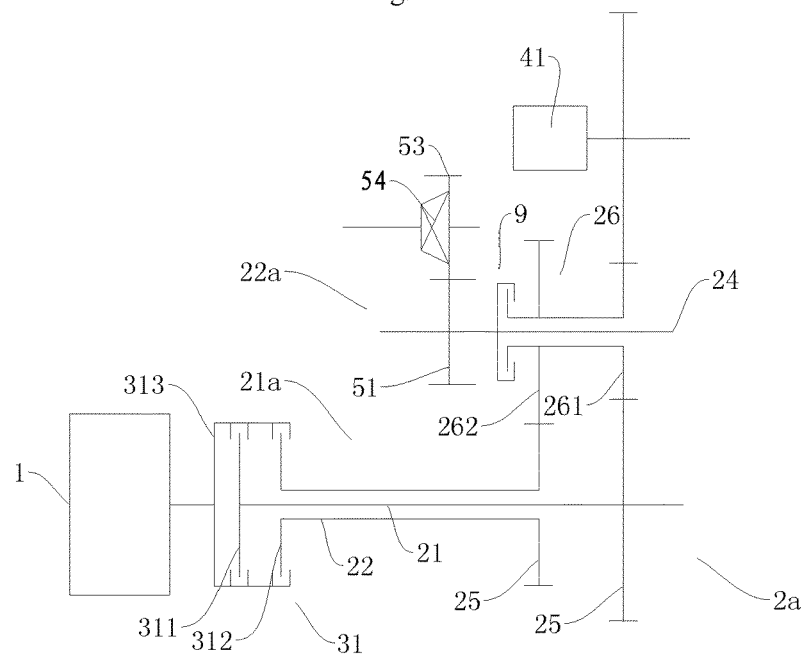
FIG. 19 is a schematic view of a power transmission system according to yet another embodiment of the present disclosure.

In some embodiments, as shown in FIGS. 17-19, the synchronizer 6 of the power transmission system 100 can be replaced with a clutch 9.

Specifically, in this embodiment, as shown in FIGS. 17-19, the power switching device is a clutch 9. The clutch 9 is adapted to enable or interrupt a power transmission between the transmission unit 2a and the output unit 5. In other words, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In this embodiment, as shown in FIGS. 17-19, specifically, the power transmission system 100 may include an engine unit 1, a plurality of input shafts, an output shaft 24, an output unit 5 (e.g., the driving gear 51 of the final drive), a clutch 9 and a first motor generator 41.

The power transmission system 100 in such a variation differs from the power transmission system 100 shown in FIGS. 14-16 in that the synchronizer 6 is replaced by a clutch 9, and the clutch 9 is configured to engage with the linked gear 26 and the output shaft 24. In this embodiment, the arrangement of the first motor generator 41 is complete the same with that of the first motor generator 41 in the power transmission system 100 shown in FIGS. 14-16.

In some embodiments, as shown in FIGS. 17-19, a plurality of input shafts is provided, the input shafts is provided with the driving gears 25 thereon. The linked gear 26 is may rotate differentially (i.e., at a different speed) relative to the output shaft 24. The linked gear 26 is freely fitted over the output shaft 24. The linked gear 26 has a plurality of gear parts (for example, the first gear part 261, and the second gear part 262), and the gear parts are meshed with the driving gears 25 on the input shafts respectively.

As shown in FIGS. 17-19, the output unit 5 is configured to output the power from the output shaft 24. For example, the output unit 5 is fixed on the output shaft 24. In one embodiment, by way of example and without limitation, the output unit 5 may include the driving gear 51 of the final drive.

The clutch 9 is configured to selectively engage with the linked gear 26 and the output shaft 24, so as to output the power via the output unit 5 to drive the wheels of the vehicle. The power transmission between the first motor generator 41 and one of the input shaft and the output shaft 24 may be direct or indirect.

According to embodiments of the present disclosure, the clutch 9 is configured to engage with the linked gear 26 and the output shaft 24. In this way, the first motor generator 41 is engaged by internal feature of the clutch 9, for example, the friction force, without requiring to adjust the speed, thus reducing the adjusting the speed step and simplifying the control strategy greatly.

Moreover, the speed of the first motor generator 41 may be adjusted so as to engage the clutch 9 in a time efficient manner. For example, the first motor generator 41 may adjust the speed of the output unit 5 as a target speed, to adjust the speed of the linked gear 26 by changing the rotating speed, so as to match the speed of the linked gear 26 with the rotating speed of the output shaft 24 in a time efficient manner, thus reducing the abrasion of the clutch 9 during the engagement, reducing the energy loss, and greatly improving the transmission efficiency. In addition, the life of the clutch 9 may be further extended, thus reducing the maintenance cost of the vehicle.

In addition, by using the linked gear 26, the power transmission system 100 is more compact in structure and easy to arrange, and the number of the driven gears may be decreased so as to reduce the axial dimension of the power transmission system 100, thus reducing the cost and the arrangement difficulty.

In some embodiments, the input shafts are coaxial and fitted over one another, each input shaft is provided with one driving gear 25. Specifically, in one embodiment, the input shafts include a first input shaft 21 and a second input shaft 22, and each input shaft is provided with one driving gear 25. The linked gear 26 is a double-linked gear, the double-linked gear 26 has a first gear part 261 and a second gear part 262, and the first gear part 261 and the second gear part 262 are meshed with two driving gears 25 respectively.

A dual clutch 31 may be disposed between the engine unit 1 and the first and second input shafts 21, 22, which is similar to the dual clutch 31 in the power transmission system 100 shown in FIGS. 2-13. Alternatively, the dual clutch 31 may be provided with a damping structure thereon, for example, the damping structure may be arranged between a first output terminal and an input terminal of the dual clutch 31, so as to adapt to start the vehicle at a low gear.

As shown in FIGS. 17-19, direct or indirect power transmission between an output terminal of the first motor generator 41 and one driving gear is performed.

For example, the power transmission system 100 in this embodiment further includes an intermediate shaft 45. A first intermediate shaft gear 451 and a second intermediate shaft gear 452 are fixed on the intermediate shaft 45. One of the first and second intermediate shaft gears 451, 452 is meshed with one driving gear 25, for example, in the example shown in FIGS. 17-18, the first intermediate shaft gear 451 is meshed with the driving gear 25 on the second input shaft 22, however, the present disclosure is not limited to this embodiment.

In some embodiments, direct power transmission between the output terminal of the first motor generator 41 and one of the first and second intermediate shaft gears 451, 452 or indirect power transmission between the output terminal of the first motor generator 41 and one of the first and second intermediate shaft gears 451, 452 via an intermediate idler 44 is performed. For example, in the example shown in FIG. 17, indirect power transmission between the output terminal of the first motor generator 41 and the second intermediate shaft gear 452 via an intermediate idler 44 is performed. As another example, in the example shown in FIG. 18, the output terminal of the first motor generator 41 is directly meshed with the second intermediate shaft gear 452 for power transmission.

As shown in FIG. 19, the output terminal of the first motor generator 41 is directly meshed with one gear part of the linked gear 26, for example, the output terminal of the first motor generator 41 is directly meshed with the first gear part 261 for power transmission.

However, it should be appreciated by those having ordinary skill in the art that, the present disclosure is not limited to this embodiment. The position of the first motor generator 41 may be designed according to practical requirements. For example, the position of the first motor generator 41 may be the same as that described above, or may be that shown in FIGS. 2-13, which will not be described in detail here.

As shown in FIGS. 17-18, the first gear part 261 inputs a torque to the engine unit 1 separately, and the second gear part 262 may input a torque to at least one of the engine unit 1 and the first motor generator 41.

Figure 20:
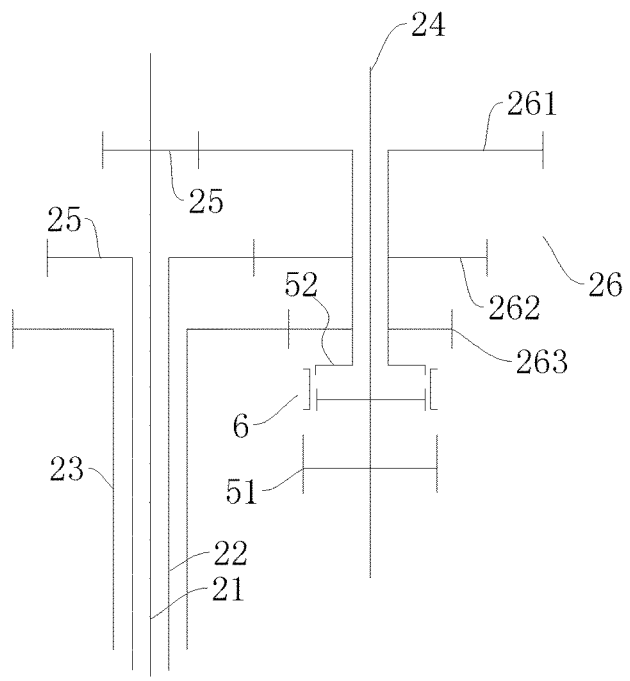
FIG. 20 is a schematic view of a power transmission system according to yet another embodiment of the present disclosure.

In some embodiments, three input shafts are provided. The triple clutch and three input shafts are described above and shown in FIG. 8, so detailed description thereof will be omitted here. In some embodiments, as shown in FIG. 20, the linked gear 26 is a triple-linked gear. The linked gear 26 has a first gear part 261, a second gear part 262 and a third gear part 263, and the first gear part 261, the second gear part 262 and the third gear part 263 are configured to mesh with the three driving gears 25 on the three input shafts respectively.

In these embodiments of the variation of the clutch, the power transmission system 100 may include a second motor generator 42 and a third motor generator 43, arrangements of the second motor generator 42 and the third motor generator 43 are substantially the same as that of the power transmission system 100 shown in FIGS. 2-13.

In this embodiment, the clutch 9 has a driving part (Cdriving in FIG. 17) and a driven part (Cdriven in FIG. 17). One of the driving part and the driven part of the clutch 9 is disposed on a linked gear such as a double-linked gear 26, and the other of the driving part and the driven part of the clutch 9 is disposed on the output shaft 24. The driving part and the driven part of the clutch 9 may be disengaged from or engaged with each other.

Therefore, after the driving part and the driven part of the clutch 9 are engaged with each other, the output shaft 24 is engaged with the double-linked gear 26 freely fitted over the output shaft 24, so as to output the power via the output unit 5. After the driving part and the driven part of the clutch 9 are disengaged from each other, the linked gear 26 is freely fitted over the output shaft 24, and the output unit 5 does not transfer the power from the transmission unit 2a.

For example, in the example shown in FIG. 17, the driving part may be disposed on the output shaft 24, and the driven part may be disposed on the linked gear 26, but the present disclosure is not limited to this embodiment. In some embodiments, the clutch may adopt a plate clutch has a driving part and a driven part. With the power transmission system 100 according to embodiments of the present disclosure, since the synchronizer 6 is used for power switching and has advantages of small volume, simple structure, large torque transmission and high transmission efficiency, the power transmission system 100 according to embodiments of the present disclosure has a reduced volume, a more compact structure and high transmission efficiency, and may meet the large-torque transmission requirements.

Meanwhile, by the speed compensation of at least one of the first motor generator 41, the second motor generator 42 and the third motor generator 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments, in order to achieve the torque distribution of each wheel, as shown in FIGS. 2-3, 5, 6 and 8, four motor generators are used, and each motor generator is configured to drive one wheel. In the related art, a mechanical four-wheel drive vehicle may only achieve the torque distribution of front and rear wheels, and a full-time four-wheel drive vehicle may only achieve small difference in instantaneous torque of left and right wheels. However, in the above six embodiments, since four motors are used for driving the vehicle, +100% to −100% torque difference adjusting of the left and right wheel motors may be realized, thus greatly enhancing the steering stability during the high-speed turning, and improving the understeer and oversteer. Furthermore, the turning radius of the vehicle may be greatly reduced by the rotation of the left and right wheels in opposite directions when the vehicle runs at a low speed, such that the vehicle is easy to operate.

The construction and operating conditions of the power transmission system 100 in various examples will be simply described below with reference to FIGS. 2-19.

Example 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, and indirect power transmission between the first motor generator 41 and the driving gear 25 on the second input shaft 22 is performed via one intermediate gear 411. The output shaft 24 is provided with two driven gears 26, and the two driven gears 26 are meshed with the driving gears 25 on the first input shaft 21 and the second input shaft 22, so as to form two gears.

The synchronizer 6 is fixed on the output shaft 24, the driving gear (i.e. the output gear 51) of the final drive may rotate differentially relative to the output shaft 24, the engagement gear ring 52 adapted to the synchronizer 6 is fixed at a left side of the driving gear of the final drive. The driving gear of the final drive is externally meshed with the driven gear 53 of the final drive, and the driven gear 53 of the final drive may be fixed on the differential 54, so as to transfer the power to the differential 54. The differential 54 distributes the power and adaptively transfers the distributed power to half axles at two sides of the vehicle, so as to drive the wheels 200.

Two second motor generators 42 constitute wheel-side motors configured to drive two front wheels 210 respectively, and two third motor generators 43 constitute wheel-side motors configured to drive two rear wheels 220 respectively. That is, each of the four wheels is provided with one wheel-side motor.

With the power transmission system 100 in this example, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the final drive and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two third motor generators 43 are wheel-side motors, and may directly drive two rear wheels 220 respectively.

The power transmission system 100 in this example may have at least the following operating conditions: a pure EV (electric vehicle) operating condition of the third motor generator 43, a pure EV four-wheel drive operating condition, a parallel operating condition, a series operating condition, a hybrid operating condition, and a braking/decelerating feedback operating condition.

First Operating Condition

This operating condition is a pure EV operating condition of the third motor generator 43. The dual clutch 31 is in a disengaged state, the synchronizer 6 is in a disengaged state, the engine unit 1, the first motor generator 41 and the second motor generator 42 do not operate, and two third motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the third motor generators 43 directly drive the rear wheels 220, compared to a front-wheel drive vehicle, the vehicle in this example has better acceleration performance, gradeability and steering capability. Moreover, since the third motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two third motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and two third motor generators 43 drive four wheels independently, the wheels may obtain different torques and rotating speeds, so as to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the final drive via the shift gear set and the synchronizer 6, and the driving gear 51 of the final drive transfers the power to the front wheels 210 via the differential 54, while two second motor generators 42 transfer the power to the corresponding front wheels 210 and two third motor generators 43 transfer the power to the corresponding rear wheels 220. This operating condition is mainly applicable to a situation where a load is the largest, for example, during quick acceleration, or climbing steep slopes.

This operating condition has the advantages that five motor generators and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability. Moreover, since the third motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the third motor generators 43 are configured to drive the rear wheels 220 respectively. This operating condition is mainly applicable to a situation where a load is medium and an electric quantity of a battery is small.

This operating condition has the advantages that, compared to a front-wheel drive vehicle and a rear-wheel drive vehicle, the vehicle under the series (i.e. four-wheel drive series) operating condition has better acceleration performance, gradeability, handling performance and off-road capability. Since two second motor generators 42 and two third motor generators 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the third motor generators 43 brake the rear wheels 220 and generate electricity. This operating condition is mainly used for braking or decelerating the vehicle.

This operating condition has the advantages that, since the second motor generator 42 and the third motor generator 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the final drive via the shift gear set and the synchronizer 6, the second motor generators 42 drive the front wheels 210 directly via the driving gear 51 of the final drive, and the third motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic property of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear of the final drive as a target speed through the rotating speed control, so as to match the rotating speed of the output shaft 24 with the rotating speed of the driving gear of the final drive as far as possible, thus facilitating the engagement of the synchronizer 6.

During the matching, the second motor generators 42 and the third motor generators 43 may respond to the needs of the driver to increase the torque, such that the vehicle is accelerated, unlike a vehicle in the related art which is accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 and the third motor generators 43 may meet the braking feedback requirements, and the feedback of the first motor generator 41 is not needed. At this time, the second motor generators 42 and the third motor generators 43 may respond to the needs of the driver to brake the wheels and feedback the electric quantity, which need not be like a vehicle in the related art which feeds back the electric quantity only when the synchronizer 6 is in an engaged state.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 is difficult due to the instability of the speed of the vehicle. Even if the first motor generator 41 may adjust the rotating speed of the output shaft 24 through the rotating speed control, since the rotating speed of the driving gear of the final drive along with the speed of the vehicle is not controllable, the speed adjusting accuracy and rate of the first motor generator 41 may be reduced. Under such road conditions, since the second motor generators 42 and the third motor generators 43 may compensate for the torque of the vehicle, the speed of the vehicle may be stabilized effectively, thus improving the driving experience of the vehicle and simplifying the engagement of the synchronizer 6.

Example 2

As shown in FIG. 3, the power transmission system 100 in this example differs from the power transmission system 100 shown in FIG. 2 in the arrangement of the third motor generators 43. In this example, each third motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that the power transfer between the third motor generators 43 and the corresponding rear wheels 220 is performed via the second speed changing mechanism 72, which will not be detailed here.

Example 3

As shown in FIG. 4, the power transmission system 100 in this example differs from the power transmission system 100 shown in FIG. 2 in the arrangement of the third motor generators 43. In this example, one third motor generator 43 is provided and drives the rear wheels 220 via one first speed changing mechanism 71. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that since two rear wheels 220 are driven by one third motor generator 43 and one first speed changing mechanism 71, in the premise of no new components, the differential rotation of the rear wheels 220 may not be realized by means of only one motor and one speed changing mechanism, however, it should be appreciated by those having ordinary skill in the art that a differential integrally formed with the first speed changing mechanism 71 may be added to realize the differential rotation of the two rear wheels 220.

Example 4

As shown in FIG. 5, the power transmission system 100 in this example differs from the power transmission system 100 shown in FIG. 2 in the arrangement of the second motor generators 42. In this example, the second motor generators 42 are disposed at two sides of the differential 54 back to back respectively. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

Example 5

As shown in FIG. 6, the power transmission system 100 in this example differs from the power transmission system 100 shown in FIG. 5 in the arrangement of the third motor generators 43. In this example, each third motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

Example 6

As shown in FIG. 7, the power transmission system 100 in this example differs from the power transmission system 100 shown in FIG. 5 in the arrangement of the third motor generators 43. In this example, one third motor generator 43 is provided and drives the rear wheels 220 via one first speed changing mechanism 71. Other parts in this example are substantially the same as those in the power transmission system 100 shown in FIG. 5, so the detailed description thereof will be omitted here. The operating conditions of the power transmission system 100 in this example are substantially the same as those of the power transmission system 100 shown in Fig., except that since two rear wheels 220 are driven by one third motor generator 43 and one first speed changing mechanism 71, in the premise of no new components, the differential rotation of the rear wheels 220 may not be realized by means of only one motor and one speed changing mechanism, however, it should be appreciated by those having ordinary skill in the art that a differential integrally formed with the first speed changing mechanism 71 may be added to realize the differential rotation of the two rear wheels 220.

Example 7

As shown in FIG. 8, the power transmission system 100 in this example differs from the power transmission system 100 shown in FIG. 2 in the type of the clutch as well as the number of the input shafts, the driving gears 25 and the driven gears 26. In this example, the clutch is a triple clutch 32, three input shafts are provided, and correspondingly three pairs of driving gears 25 and driven gears 26 are provided. Other parts in this example are substantially the same as those in the power transmission system 100 shown in FIG. 2, so the detailed description thereof will be omitted here.

Example 8

As shown in FIG. 9, the power transmission system 100 in this example differs from the power transmission system 100 shown in FIG. 2 in that the third motor generators 43 in the example shown in FIG. 2 are eliminated, and the power transmission system 100 in this example is in a two-wheel drive mode.

The power transmission system 100 in this example may have at least the following operating conditions.
First Operating Condition This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components is the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the final drive via the shift gear set and the synchronizer 6, and the driving gear 51 of the final drive evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the final drive via the shift gear set and the synchronizer 6, the driving gear 51 of the final drive evenly distributes the power to the left and right front wheels 210 via the differential 54, and the second motor generators 42 directly drive the left and right front wheels 210. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the front wheels 210. This operating condition is mainly applicable to a situation where a load is medium and an electric quantity of a battery is small.

This operating condition has the advantages that, since the second motor generators 42 directly drive the front wheels 210, the transmission chain is the shortest, and operating components is the fewest, thus achieving maximum transmission efficiency and minimum noise.

Meanwhile, the first motor generator 41 may keep the engine unit 1 running in an optimal economic region through the torque and speed control, thus reducing fuel consumption during the electricity generation. Moreover, since the second motor generators 42 independently drive the left front wheel 210 and the right front wheel 210 respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generator 42 directly brake the front wheels 210 and generate electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, so as to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear 51 of the final drive as a target speed through the rotating speed control, so as to match the rotating speed of the output shaft 24 with the rotating speed of the driving gear 51 of the final drive as far as possible, thus facilitating the engagement of the synchronizer 6.

During the matching, the second motor generators 42 may respond to the needs of the driver to increase the torque, such that the vehicle is accelerated, unlike a vehicle in the related art which is accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may respond to the needs of the driver to brake the wheels and feed back the electric quantity. The vehicle does not require the synchronizer 6 to be in an engaged state to feed back the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 is difficult due to the instability of the speed of the vehicle. Even if the first motor generator 41 may adjust the rotating speed of the output shaft 24 through the rotating speed control, since the rotating speed of the driving gear of the final drive along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

Example 9

As shown in FIG. 10, the power transmission system 100 in this example differs from the power transmission system 100 shown in FIG. 9 in the arrangement of the second motor generators 42. In this example, the second motor generators 42 are disposed at two sides of the differential 54 back to back respectively. Other parts in this example are substantially the same as those in the power transmission system 100 shown in FIG. 9, so the detailed description thereof will be omitted here.

Example 10

As shown in FIG. 11, the power transmission system 100 in this example differs from the power transmission system 100 shown in FIG. 9 in the arrangement of the second motor generators 42. In this example, two second motor generators 42 are provided, and each second motor generator 42 drives a corresponding rear wheel 220 via one fourth speed changing mechanism 74. Other parts in this example are substantially the same as those in the power transmission system 100 shown in FIG. 9, so the detailed description thereof will be omitted here.

The power transmission system 100 in this example may have at least the following operating conditions.
First Operating Condition This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel 220 via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels 220, compared to a front-wheel drive vehicle, the vehicle in this example has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.
Second Operating Condition This operating condition is a pure EV four-wheel drive operating condition. The dual clutch 31 is in a disengaged state, the synchronizer 6 is in an engaged state, the engine unit 1 does not operate, the first motor generator 41 drives the front wheels 210 respectively, and the second motor generators 42 drive the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.
Third Operating Condition This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels 220 respectively. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.
Fourth Operating Condition This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels 220 respectively. This operating condition is mainly applicable to a situation where a load is medium and an electric quantity of a battery is small. This operating condition has the advantages that, since the two second motor generators 42 independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through the torque and speed control, thus reducing fuel consumption during the electricity generation.
Fifth Operating Condition This operating condition is a braking/decelerating feedback operating condition. The dual clutch 31 is in a disengaged state, the synchronizer 6 is in an engaged state, the engine unit 1 does not operate, and the first motor generator 41 and the second motor generators 42 brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators 42 may control the braking force independently, thus improving the handling stability of the vehicle during braking when turning, and further increasing the feedback energy.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

Example 11

As shown in FIG. 12, the power transmission system 100 in this example differs from the power transmission system 100 shown in FIG. 9 in the arrangement of the second motor generators 42. In this example, one second motor generators 42 is provided, and the second motor generator 42 drives the rear wheels 220 via one third speed changing mechanism 73. Other parts in this example are substantially the same as those in the power transmission system 100 shown in FIG. 9, so the detailed description thereof will be omitted here.

In this example, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this example has better acceleration performance, gradeability and steering capability. In a front-wheel drive part, since the association between the output gear 51 and the front wheels 210 is interrupted by the synchronizer 6, there is no mechanical loss in the front-wheel drive part, thus reducing the energy consumption of the vehicle. In a rear-wheel drive part, a differential integrally formed with the third speed changing mechanism 73 may also be provided.

In this example, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drive the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this example, the power transmission system 100 may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drive the rear wheels 220. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability.

In this example, the power transmission system 100 may also have a series operating condition. The dual clutch 31 is in an engaged state, the synchronizer 6 is in a disengaged state, the engine unit 1 drives the first motor generator 41 to generate electricity, and the second motor generator 42 drive the rear wheels 220. This operating condition is mainly applicable to a situation where a load is medium and an electric quantity of a battery is small. This operating condition has the advantages that compared to a front-wheel drive vehicle, the vehicle under the series operating condition has better acceleration performance, gradeability, handling performance and steering capability. Moreover, the first motor generator 41 may keep the engine unit 1 running in an optimal economic region through the torque and speed control, thus reducing fuel consumption during the electricity generation.

In this example, the power transmission system 100 may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

Example 12

As shown in FIG. 13, the power transmission system 100 in this example differs from the power transmission system 100 shown in FIG. 9 in the arrangement of the second motor generators 42. In this example, two second motor generators 42 are provided and are wheel-side motors, and each second motor generator 42 drives a corresponding rear wheel 220. The power transmission manner in this example is similar to that shown in FIG. 11, and other parts in this example are substantially the same as those in the power transmission system 100 shown in FIG. 9, so the detailed description thereof will be omitted here.

Example 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22.

A first intermediate shaft gear 451 and a second intermediate shaft gear 452 are fixed on the intermediate shaft 45. The first intermediate shaft gear 451 is meshed with the driving gear 25 on the second input shaft 22. Indirect power transmission between the output terminal of the first motor generator 41 and the second intermediate shaft gear 452 via an intermediate idler 44 is performed.

The synchronizer 6 is fixed on the output shaft 24 and configured to engage with the double-linked gear 26. The driving gear 51 of the final drive is fixed on the output shaft 24. The driving gear 51 of the final drive is externally meshed with the driven gear 53 of the final drive, and the driven gear 53 of the final drive may be fixed on a housing of the differential 54, so as to transfer the power to the differential 54. The differential 54 distributes the power and adaptively transfers the distributed power to half axles at two sides of the vehicle, so as to drive the wheels 200.

Example 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22.

A first intermediate shaft gear 451 and a second intermediate shaft gear 452 are fixed on the intermediate shaft 45. The first intermediate shaft gear 451 is meshed with the driving gear 25 on the second input shaft 22. The output terminal of the first motor generator 41 is directly meshed with the second intermediate shaft gear 452 for power transmission.

The synchronizer 6 is fixed on the output shaft 24 and configured to engage with the double-linked gear 26. The driving gear 51 of the final drive is fixed on the output shaft 24. The driving gear 51 of the final drive is externally meshed with the driven gear 53 of the final drive, and the driven gear 53 of the final drive may be fixed on a housing of the differential 54, so as to transfer the power to the differential 54. The differential 54 distributes the power and adaptively transfers the distributed power to half axles at two sides of the vehicle, so as to drive the wheels 200.

Example 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22. The output terminal of the first motor generator 41 is directly meshed with the first gear part 261 for power transmission.

The synchronizer 6 is fixed on the output shaft 24 and configured to engage with the double-linked gear 26. The driving gear 51 of the final drive is fixed on the output shaft 24. The driving gear 51 of the final drive is externally meshed with the driven gear 53 of the final drive, and the driven gear 53 of the final drive may be fixed on a housing of the differential 54, so as to transfer the power to the differential 54. The differential 54 distributes the power and adaptively transfers the distributed power to half axles at two sides of the vehicle, so as to drive the wheels 200.

Example 16

As shown in FIG. 17, the power transmission system 100 in this example differs from the power transmission system 100 shown in FIG. 14 in that the clutch 9 is provided instead of the synchronizer 6 of the power transmission system 100 in FIG. 14, and the driving gear 51 of the final drive is fixed on the output shaft 24.

Example 17

As shown in FIG. 18, the power transmission system 100 in this example differs from the power transmission system 100 shown in FIG. 15 in that the clutch 9 is provided instead of the synchronizer 6 of the power transmission system 100 in FIG. 15, and the driving gear 51 of the final drive is fixed on the output shaft 24.

Example 18

As shown in FIG. 19, the power transmission system 100 in this example differs from the power transmission system 100 shown in FIG. 16 in that the clutch 9 is provided instead of the synchronizer 6 of the power transmission system 100 in FIG. 16, and the driving gear 51 of the final drive is fixed on the output shaft 24.

As shown in FIGS. 14-19, in a variation of the linked gear 26, the power transmission system 100 may further include at least one of the second motor generator 42 and the third motor generator 43 (not shown in FIGS. 14-19), and the arrangement of at least one of the second motor generator 42 and the third motor generator 43 may be the same as that in FIGS. 2-13, for example, being in a wheel-side form, or being disposed at two sides of the differential back to back. For example, alternatively, the driving gear 51 of the final drive of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

In some embodiments, the second motor generator 42 is configured to drive the front and/or rear wheels 210, 220.

In some embodiments, the second motor generator 42 is configured to drive the front wheels 210, and the third motor generator 43 is configured to drive the rear wheels 220.

Embodiments of the present disclosure further provide a vehicle including the abovementioned power transmission system 100. It should be appreciated that, other components (e.g., a driving system, a steering system, and a braking system) of the vehicle according to embodiments of the present disclosure are well known to those skilled in the art, so the detailed description thereof will be omitted here.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power transmission system for a vehicle, comprising:
    an engine unit;
    a plurality of input shafts, wherein the engine unit is configured to selectively engage with one of the input shafts when the engine unit transmits power to the input shafts;
    a plurality of driving gears with one driving gear disposed on one input shaft;
    an output shaft configured to transfer the power from the input shafts;
    one or more linked gears rotatable at a different speed relative to the output shaft, wherein the linked gears include a plurality of gear parts, the gear parts being configured to mesh with the driving gears on the input shafts;
    an output unit coupled on the output shaft and configured to transmit the power to front wheels of the vehicle;
    a clutch disposed on the output shaft and configured to selectively engage with one of the linked gears and the output unit so as to drive one or more wheels of the vehicle via the power output by the output unit;
    a first motor generator configured to couple with one of the input shaft and the output shaft for power transmission; and
    an intermediate shaft and first and second gears fixed on the intermediate shaft, wherein one of the first and second gears is configured to mesh with one of the driving gears, the first motor generator includes an output terminal directly coupled with the other one of the first and second gears for power transmission, or the output terminal of the first motor generator is indirectly coupled with the other one of the first and second gears via an intermediate idler for power transmission.

2. The power transmission system according to claim 1, wherein the output unit is fixed on the output shaft.

3. The power transmission system according to claim 1, wherein the plurality of input shafts are coaxial and fitted over one another sequentially, and the driving gear are fixed on the input shafts respectively.

4. The power transmission system according to claim 1, wherein the plurality of input shafts comprise a first input shaft and a second input shaft fitted over the first input shaft, two driving gears are disposed on the first input shaft and the second input shaft respectively,
    wherein the one or more linked gears comprise a double-linked gear, the double-linked gear comprises a first gear part and a second gear part, and the first gear part and the second gear part are configured to mesh with the two driving gears respectively.

5. The power transmission system according to claim 4, further comprising:
    a dual clutch including an input terminal coupled with the engine unit, a first output terminal coupled with the first input shaft, and a second output terminal coupled with the second input shaft.

6. The power transmission system according to claim 1, wherein the clutch has a driving part and a driven part, the driving part of the clutch is disposed on one of the linked gear and the output shaft, and the driven part of the clutch is disposed on the other of the linked gear and the output shaft; and wherein the driving part and the driven part of the clutch may be disengaged from or engaged with each other.

7. The power transmission system according to claim 1, wherein the first motor generator comprises an output terminal coupled with one of the driving gears for power transmission.

8. The power transmission system according to claim 1, wherein the output unit further comprises a final drive having a driving gear.

9. The power transmission system according to claim 1, wherein the plurality of input shafts comprise a first input shaft, a second input shaft fitted over the first input shaft, and a third input shaft fitted over the second input shaft;

three driving gears are disposed on the first, second and third input shafts correspondingly; and the one or more linked gears comprise a triple-linked gear, the triple-linked gear comprises a first gear part, a second gear part and a third gear part, and the first gear part, the second gear part and the third gear part are configured to mesh with the three driving gears respectively.

10. The power transmission system according to claim 9, further comprising:

a triple clutch including an input terminal coupled with the engine unit, a first output terminal coupled with the first input shaft, a second output terminal coupled with the second input shaft, and a third output terminal coupled with the third input shaft.

11. The power transmission system according to claim 1, further comprising a second motor generator configured to drive front or rear wheels of the vehicle.

12. The power transmission system according to claim 11, further comprising a third motor generator configured to drive rear wheels of the vehicle, and the second motor generator is configured to drive front wheels of the vehicle.

13. A vehicle comprising a power transmission system according to claim 1.

14. A vehicle comprising a power transmission system, wherein the power transmission system comprises:

an engine unit;

a plurality of input shafts, wherein the engine unit is configured to selectively engage with one of the input shafts when the engine unit transmits power to the input shafts;

a plurality of driving gears with one driving gear disposed on one input shaft;

an output shaft configured to transfer the power from the input shafts;

one or more linked gears rotatable at a different speed relative to the output shaft, wherein the linked gears include a plurality of gear parts, the gear parts being configured to mesh with the driving gears on the input shafts;

an output unit coupled on the output shaft and configured to transmit the power to front wheels of the vehicle;

a clutch disposed on the output shaft and configured to selectively engage with one of the linked gears and the output unit so as to drive one or more wheels of the vehicle via the power output by the output unit;

a first motor generator configured to couple with one of the input shaft and the output shaft for power transmission; and an intermediate shaft and first and second gears fixed on the intermediate shaft, wherein one of the first and second gears is configured to mesh with one of the driving gears, the first motor generator includes an output terminal directly coupled with the other one of the first and second gears for power transmission, or the output terminal of the first motor generator is indirectly coupled with the other one of the first and second gears via an intermediate idler for power transmission.

15. The vehicle according to claim 14, wherein the output unit is fixed on the output shaft.

16. The vehicle according to claim 14, wherein the plurality of input shafts are coaxial and fitted over one another sequentially, and the driving gear are fixed on the input shafts respectively.

17. The vehicle according to claim 14, wherein the plurality of input shafts comprise a first input shaft and a second input shaft fitted over the first input shaft, two driving gears are disposed on the first input shaft and the second input shaft respectively, wherein the one or more linked gears comprise a double-linked gear, the double-linked gear comprises a first gear part and a second gear part, and the first gear part and the second gear part are configured to mesh with the two driving gears respectively.

18. The vehicle according to claim 17, further comprising:

a dual clutch including an input terminal coupled with the engine unit, a first output terminal coupled with the first input shaft, and a second output terminal coupled with the second input shaft.

19. The vehicle according to claim 14, wherein the clutch has a driving part and a driven part, the driving part of the clutch is disposed on one of the linked gear and the output shaft, and the driven part of the clutch is disposed on the other of the linked gear and the output shaft; and wherein the driving part and the driven part of the clutch may be disengaged from or engaged with each other.

* * * * *